United States Patent [19]
Sheehan et al.

[11] Patent Number: 5,155,983
[45] Date of Patent: Oct. 20, 1992

[54] DISTANCE MEASUREMENT AND CONTROL USING CODED SONIC SIGNALS

[75] Inventors: Ronald T. Sheehan, Lancaster, Pa.; Peter G. Mitchell, Concord, Mass.; Charles G. Bagg, Fitchburg, Mass.

[73] Assignee: Ford New Holland, Inc., New Holland, Pa.

[21] Appl. No.: 690,817

[22] Filed: Apr. 24, 1991

[51] Int. Cl.$^5$ .................... A01D 47/00; A01D 75/28
[52] U.S. Cl. ............................. 56/10.2; 56/DIG. 15; 172/4.5
[58] Field of Search ............... 56/15.1, 10.2, DIG. 15, 56/208, 209, 210; 172/4.5

[56] References Cited

U.S. PATENT DOCUMENTS

| | | | |
|---|---|---|---|
| 4,228,636 | 10/1980 | Homburg | 56/10.2 |
| 4,414,792 | 11/1983 | Bettencourt et al. | 56/10.2 |
| 4,507,910 | 4/1985 | Thornley et al. | 56/10.2 |
| 4,569,037 | 2/1986 | Seiferling | 367/13 |
| 4,573,124 | 2/1986 | Seiferling | 364/424 |
| 4,641,490 | 2/1987 | Wynn et al. | 56/10.2 |
| 4,663,712 | 5/1987 | Kishida | 364/424 |
| 4,896,486 | 1/1990 | Lundahl et al. | 56/10.2 |
| 4,918,608 | 4/1990 | Middleton et al. | 172/4.5 X |
| 4,924,374 | 5/1990 | Middleton et al. | 172/4.5 X |

Primary Examiner—Terry Lee Melius
Attorney, Agent, or Firm—Griffin Butler Whisenhunt & Kurtossy

[57] ABSTRACT

An agricultural harvesting machine having a cutting element movably supported thereon is provided with a height sensor including a transmitter and a receiver mounted for movement with the cutting element. The transmitter directs bursts of sound waves in the range of about 5 KHz toward the ground and echoes of the bursts are picked up by the receiver, the elapsed time between transmission and reception being an indication of the height of the cutting element above the ground. To distinguish between echoes of the bursts and environmental noise picked up by the receiver, the bursts are encoded by transmitting them in pairs, the bursts of a pair being of fixed duration and separated by a fixed interval of time. The duration of each signal and the time spacing between signals is checked and if they are not of the correct duration or are not separated by the fixed interval of time they are rejected as noise. The time between transmission and reception of a burst is measured to provide an indication of the height of the cutting element. The measured height is compared with a reference or desired height and the difference value is used to control movement of the cutting element to the desired height.

21 Claims, 16 Drawing Sheets

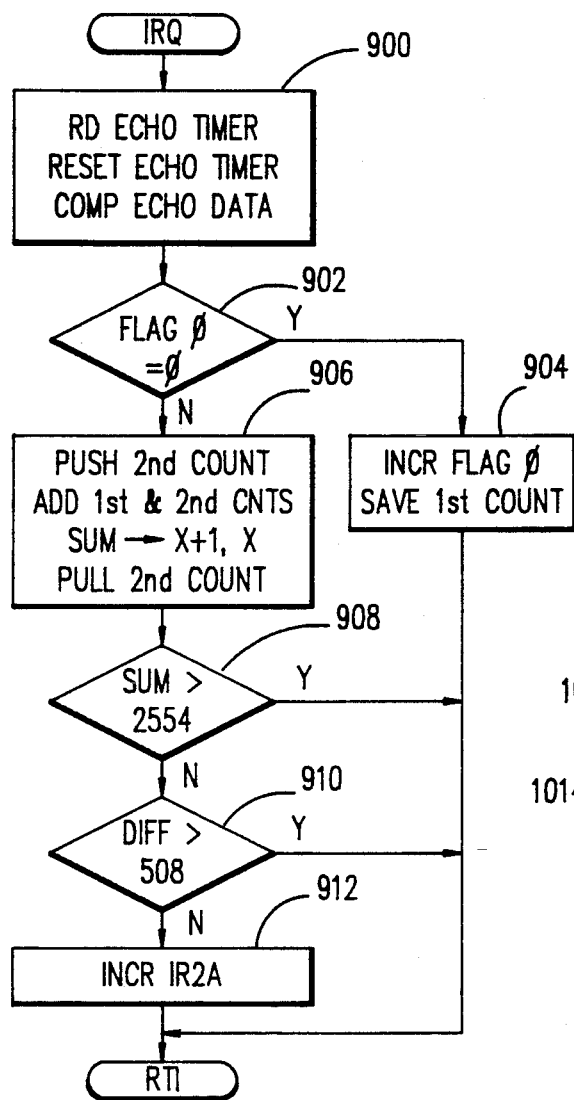
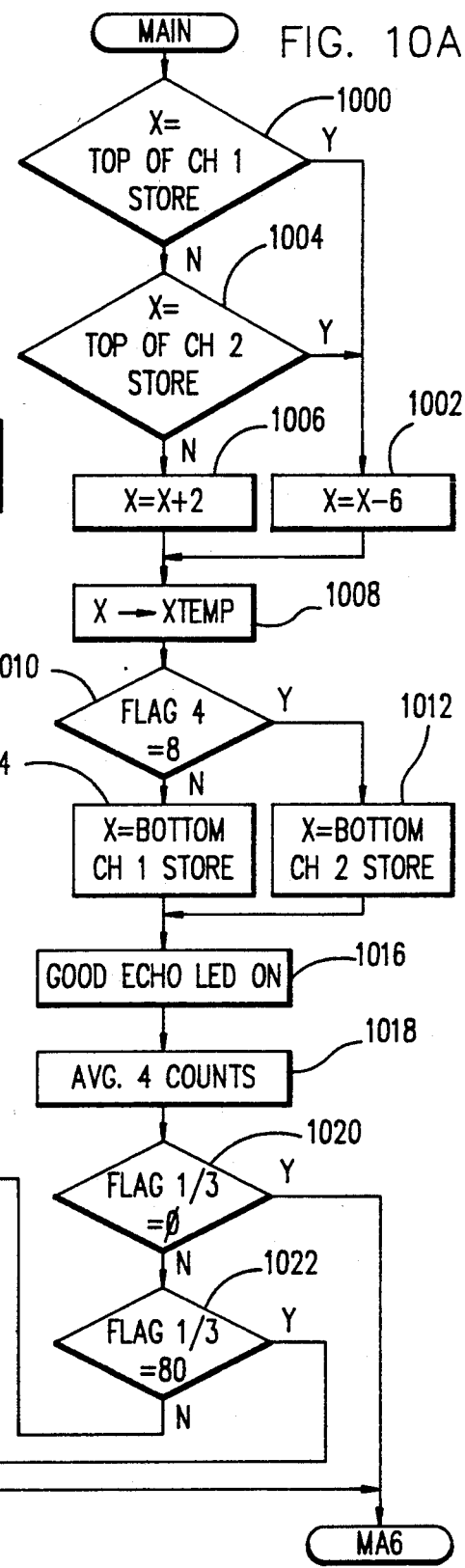
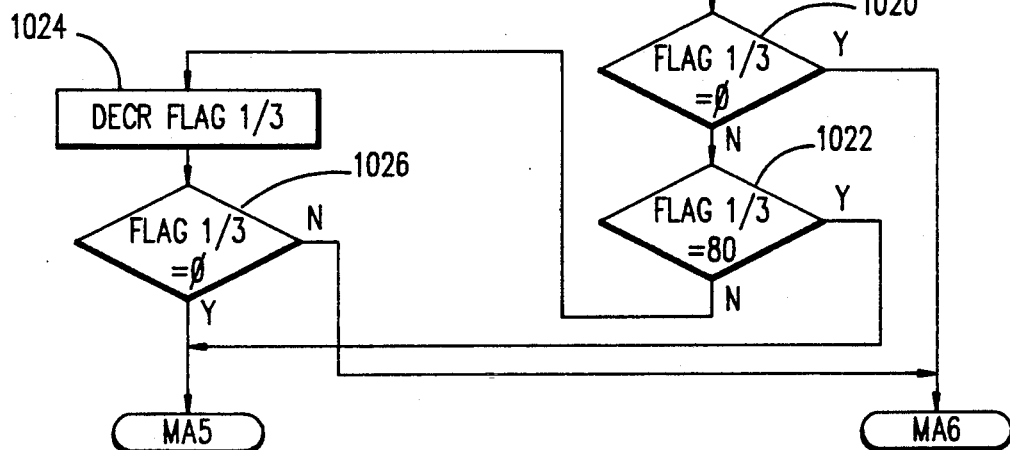
FIG. 9
FIG. 10A

DISTANCE MEASUREMENT AND CONTROL USING CODED SONIC SIGNALS

FIELD OF THE INVENTION

The present invention relates to a method of, and apparatus for, determining the distance from a sensor to the ground, the result of the determination then being used to control the position of an implement relative to the ground. More particularly, the present invention employs coded audible sound signals which penetrate foliage on the ground and are more easily distinguished from external noise than uncoded signals. The invention is particularly suited for controlling the height of a cutterbar in a crop harvesting machine.

BACKGROUND OF THE INVENTION

In agricultural machinery for harvesting crops, rough or uneven terrain causes problems in that the height of the cutting mechanism above the ground must be continuously controlled. If the cutting mechanism is set too high, an excessive crop loss may result. If the cutting mechanism is set too low, the cutting mechanism may dig into the ground, possibly causing damage to the cutting mechanism and/or causing dirt to be mixed with the cut crop material as it is fed into the machine. Initially, manual controls were provided to permit an operator to control the height of the cutting mechanism. However, manual controls require constant attention by the operator with a consequent increase in stress.

To alleviate this problem various forms of sensors employing mechanical fingers and optical transmitters/receivers have been used to derive signals for controlling the positioning of a member of an agricultural harvesting machine. The mechanical fingers suffer the disadvantage that weeds may become entangled in them thereby preventing proper functioning. Devices using optical transmitter/receivers have a tendency to fail under dusty conditions. Also, optical devices are unable to sense the ground through weeds and crops.

In a more recent development, ultrasonic transmitters/receivers have been used to develop a positioning control signal. The patents to Thornley et al. (U.S. Pat. No. 4,507,910), Bettencourt et al. (U.S. Pat. No. 4,414,792), Lundahl et al. (U.S. Pat. No. 4,896,486) and Kishida (U.S. Pat. No. 4,663,712) disclose threshing units, combine headers and reapers wherein the cutting unit is position controlled in response to signals developed by an ultrasonic sensor which is fixed relative to the cutting mechanism. In Lundahl et al. and Thornley et al., the ultrasonic signal is directed toward the top of the crop and is reflected therefrom. In Kishida and Bettencourt, the ultrasonic signal is directed toward the ground and the reflected signal is analyzed to determine the height of the sensor, and thus the height of the cutting mechanism above the ground.

While the ultrasonic sensors of Kishida and Bettencourt are capable of measuring the distance between the sensor and the ground under certain conditions, they are not capable of measuring that distance when the ground is covered with weeds. The ultrasonic signal is reflected from the weeds and does not penetrate to the ground thus giving a false indication of the sensor-to-ground distance. It is evident that this is true because the systems of Lundahl et al. and Thornley et al. are both based on the fact that there is a reflection of an ultrasonic signal from crop foliage.

Sound signals below the ultrasonic frequencies might be used to overcome the problem of false reflections from weeds and crop foliage but sound signals best suited for this purpose fall in the range of frequencies characteristic of machine noises generated by the agricultural machine during its operation. Thus, there is a problem of separating the noise from the distance measurement signals.

SUMMARY OF THE INVENTION

An object of the present invention is to provide a distance measuring device capable of measuring the distance to the ground even through there may be foliage between the ground and the distance measuring device.

A further object of the invention is to provide a distance measuring device which employs signals in the audio frequency range, the signals being coded so that they may be distinguished from noises in the surrounding environment.

Another object of the invention is to provide a method of measuring the distance from a sensor to ground through foliage, the method comprising directing a pair of bursts of signals in the audio frequency range toward the ground, the bursts of a pair being of a known duration and separated by a predetermined interval of time, sensing the signals reflected from the ground, and accepting as valid only those signals of the correct duration and separated by the predetermined interval of time.

Still another object of the invention is to provide an agricultural machine having an adjustable implement, a distance measuring device for directing coded audible signals toward the ground and sensing the signals reflected therefrom, and means responsive to the distance measuring device for adjusting the position of the implement relative to the ground.

In a first embodiment, the distance measuring device comprises an oscillator and timing logic for energizing a transmitter/receiver transducer to transmit two bursts of sound signals in the audio frequency range, the transmitted bursts being separated by a fixed interval of time. After the second burst is transmitted, a generator is turned on to generate a linearly varying signal. A delay circuit is used to check the pulse widths and time interval between a apir of echo bursts and determine if it is equal to the interval between the times the pulses were transmitted. If the echo bursts are of the correct pulse widths and separated by the required interval of time, the output of the generator is sampled and held as an indication of the distance between the transducer and ground.

In a second embodiment, a microprocessor system generates the signals for energizing the transducer to transmit the pair of bursts. The microprocessor times the interval between transmission of a burst and reception of its echo, the time count being an indication of the distance between the transducer and ground. The microprocessor also times the interval between teh first and second echo pulses of a pair, and compares this interval with the interval between the times of transmission of the bursts which produced the echoes. If this comparison shows that the echoes are good, i.e. properly spaced in time, the count indicating the distance is used to generate a signal for adjusting the position of an implement on an agricultural machine.

Other objects of the invention and its mode of operation and use will become apparent upon consideration

BRIEF DESCRIPTION OF DRAWINGS

FIG. 9 illustrates the IRQ routine;

FIGS. 10A-10C illustrate the MAIN routine;

DESCRIPTION OF THE INVENTION

While the present invention is admirably suited for use in controlling the positioning of a combine header, and will be described as used in connection therewith, it will be obvious that the invention may be used to control the positioning of any implement carried by agricultural harvesting machines, tillage machines, mine plows or other devices where the position of an implement relative to the ground must be maintained.

Figure 13A:
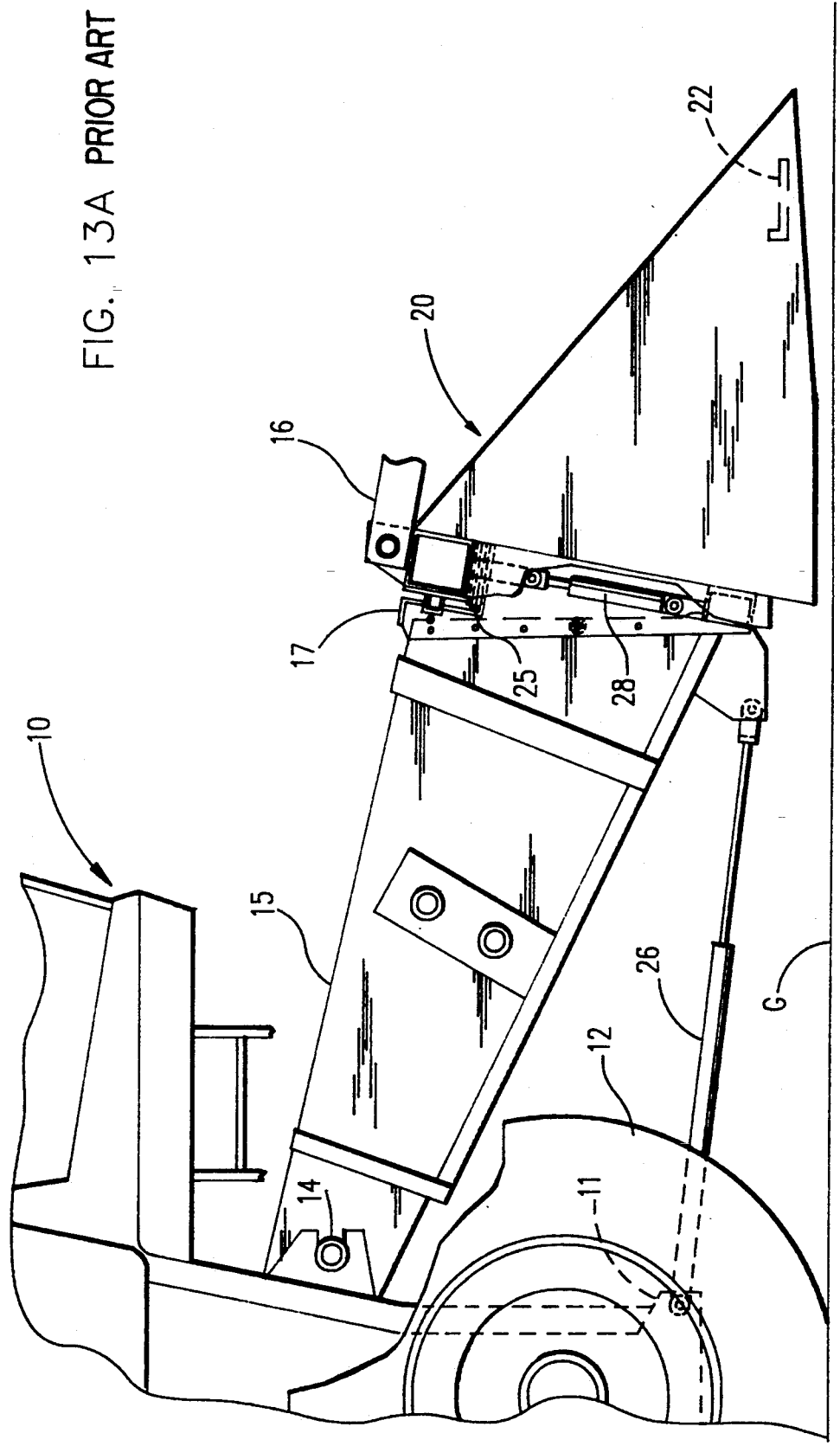
FIG. 13A schematically illustrates the front end of a prior art combine with a header mounted thereon; and, FIG. 13B illustrates a combine harvester of the prior art with horns mounted on the combine header for measuring distance.
Figure 13B:
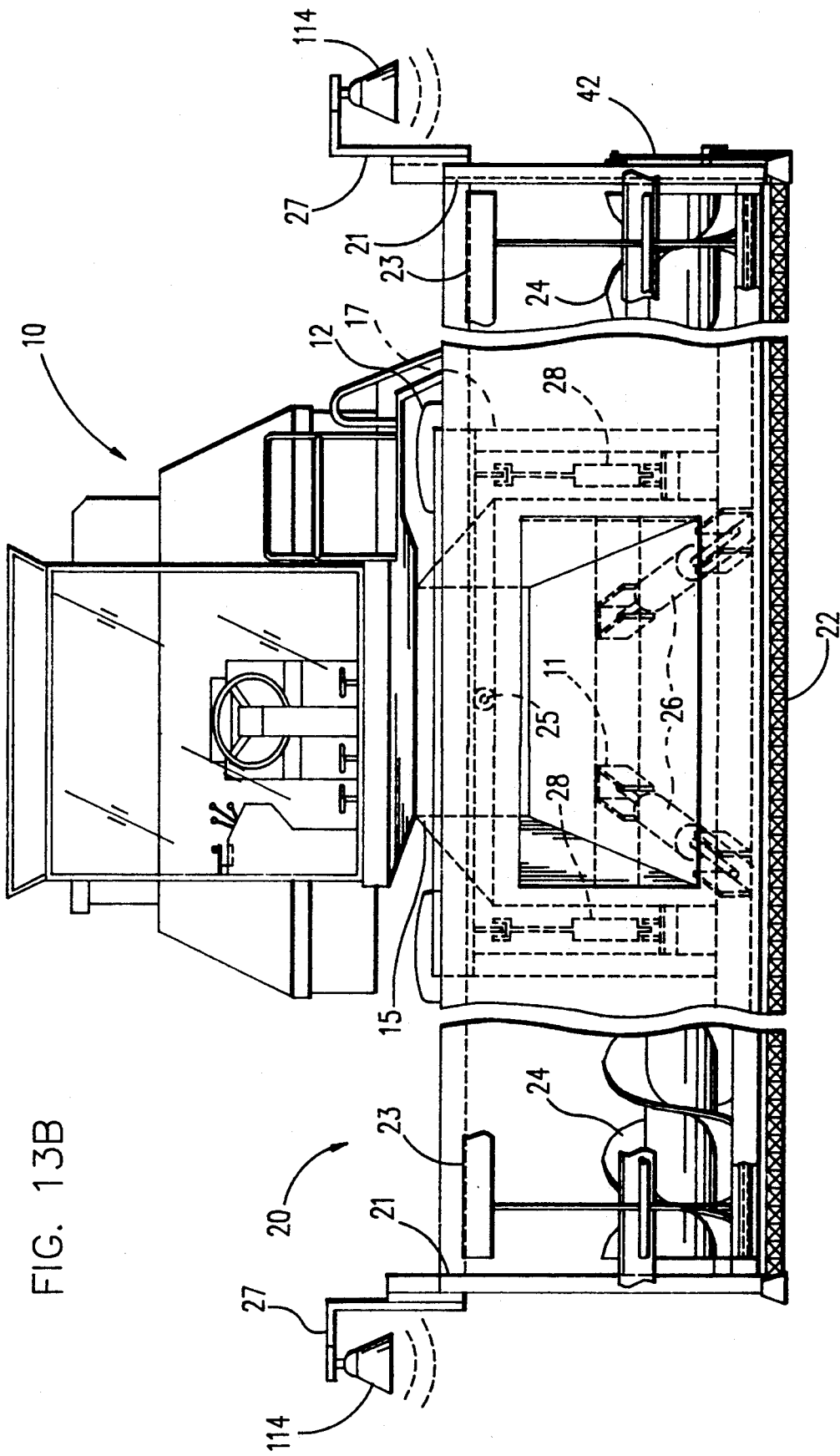

FIGS. 13A and 13B illustrate a prior art combine harvester 10 which is propelled along the ground G on wheels 12. The harvester 10 is provided with a feederhouse 15 projecting forwardly therefrom. The feederhouse is pivotally supported at 14 on the frame 11 of the combine. Two hydraulic cylinders 26 are connected between the forward end of the feederhouse and frame 11. The hydraulic cylinders 26 may be extended or retracted to pivot the feederhouse 15 in a vertical plane about pivot 14.

The front end of the feederhouse 15 is provided with a cradle 17 for pivotally supporting a crop harvesting header 20. The header is mounted for pivoting movement about a pivot axis 25 (FIG. 13B) in response to selective actuation of two hydraulic cylinders 28. The header 20 carries a cutterbar or sickle 22 for cutting crop material. A pair of arms 16 support a rotatable reel 23 which engages standing crop material and sweeps it over the cutterbar 22. The cut crop material is consolidated by an auger 24 and conveyed into the front end of the feederhouse 15 from whence it is conveyed through the feederhouse and into the combine 10.

Reference may be made to Wynn et al. Patent U.S. Pat. No. 4,641,490, the disclosure of which is incorporated herein by reference, for a more complete description of the header 20 and the structure for supporting and moving it.

To control movement of the header 20 so that the cutterbar 22 is maintained at a substantially constant height above the ground as the combine moves over uneven ground, the present invention provides a method and means for determining the distance between the cutterbar and the ground, and in response to that determination controlling the hydraulic cylinders 26 to raise or lower the header by pivoting the feederhouse 15 about pi8vots 14, or controlling the hydraulic cylinders 28 to tilt the header 20 about the pivot 25. Two horns 114 (FIG. 13B) are provided. Each horn is mounted on a support 27 which is in turn mounted on a side sheet 21 of the header so that each horn is supported laterally of the header 20.

Each horn includes a piezoelectric transducer which is pulsed as subsequently described so as to emit bursts of audible sound waves. These sound waves travel to the ground and are reflected from the ground back to the horn. The reflected or "echo" sound waves strike the piezoelectric transducer which produces an electrical output signal. The interval between the time a sound wave is transmitted and the time its echo is received provides an indication of the distance the sound travelled. If the horn 114 is directed vertically downwardly, the elapsed time is a measure of the distance from the horn to the ground. Furthermore, since horns 114 and the cutterbar 22 move together on header 20, the elapsed time is also an indication of the distance between the cutterbar and the ground. In a preferred embodiment the horns 114 are located in the same vertical plane as the cutterbar. Although this is not absolutely necessary, it does avoid triangulation calculations which become necessary if the horns and cutterbar are at substantially different distances from the pivot point 14. Furthermore, the horns need not be directed vertically but may be positioned to direct the sound bursts toward the ground slightly forwardly of the cutterbar 22.

Figure 1A:
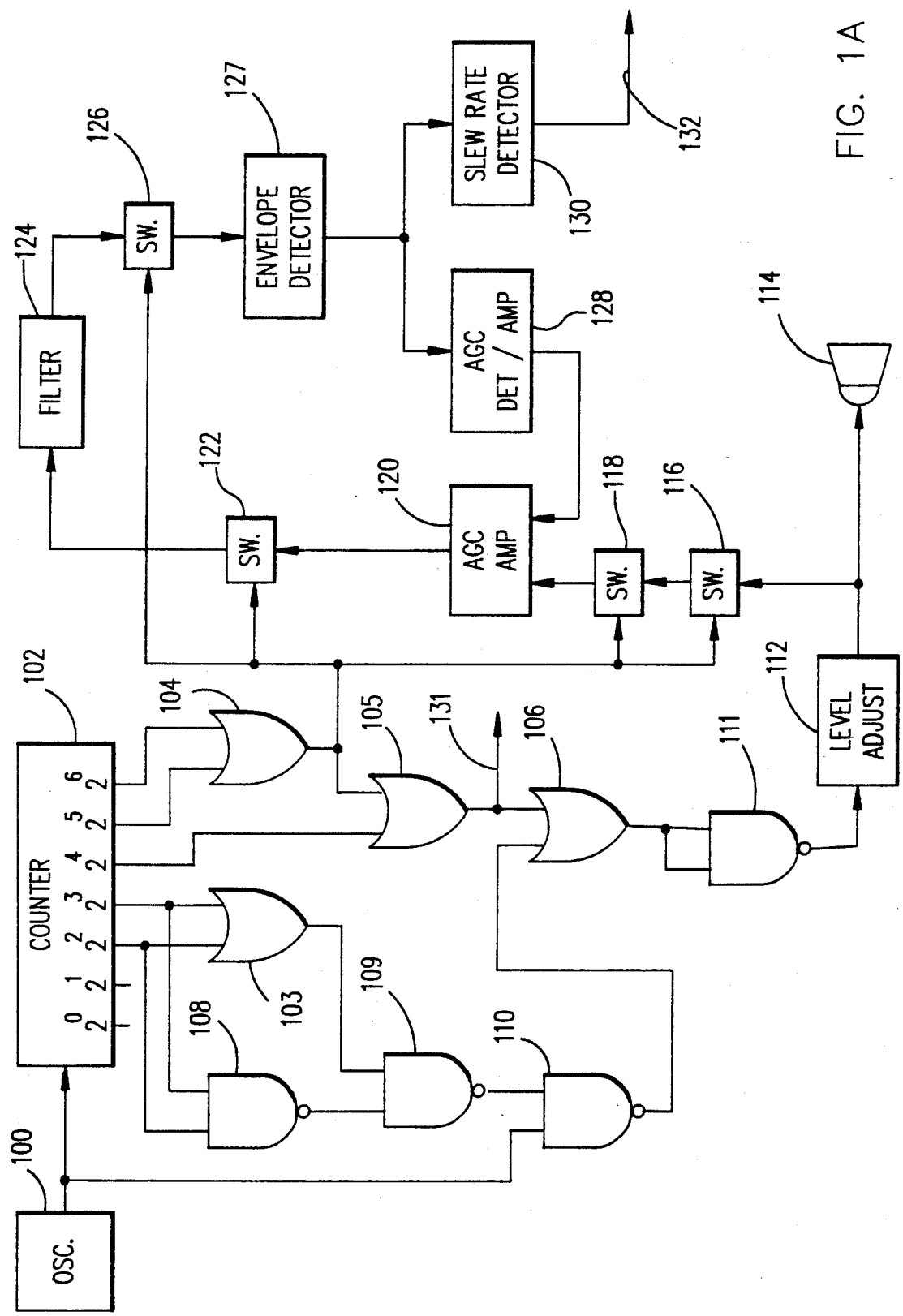
FIGS. 1A and 1B comprise a circuit diagram of a first embodiment of a distance measuring device constructed in accordance with the principles of the present invention.
Figure 1B:
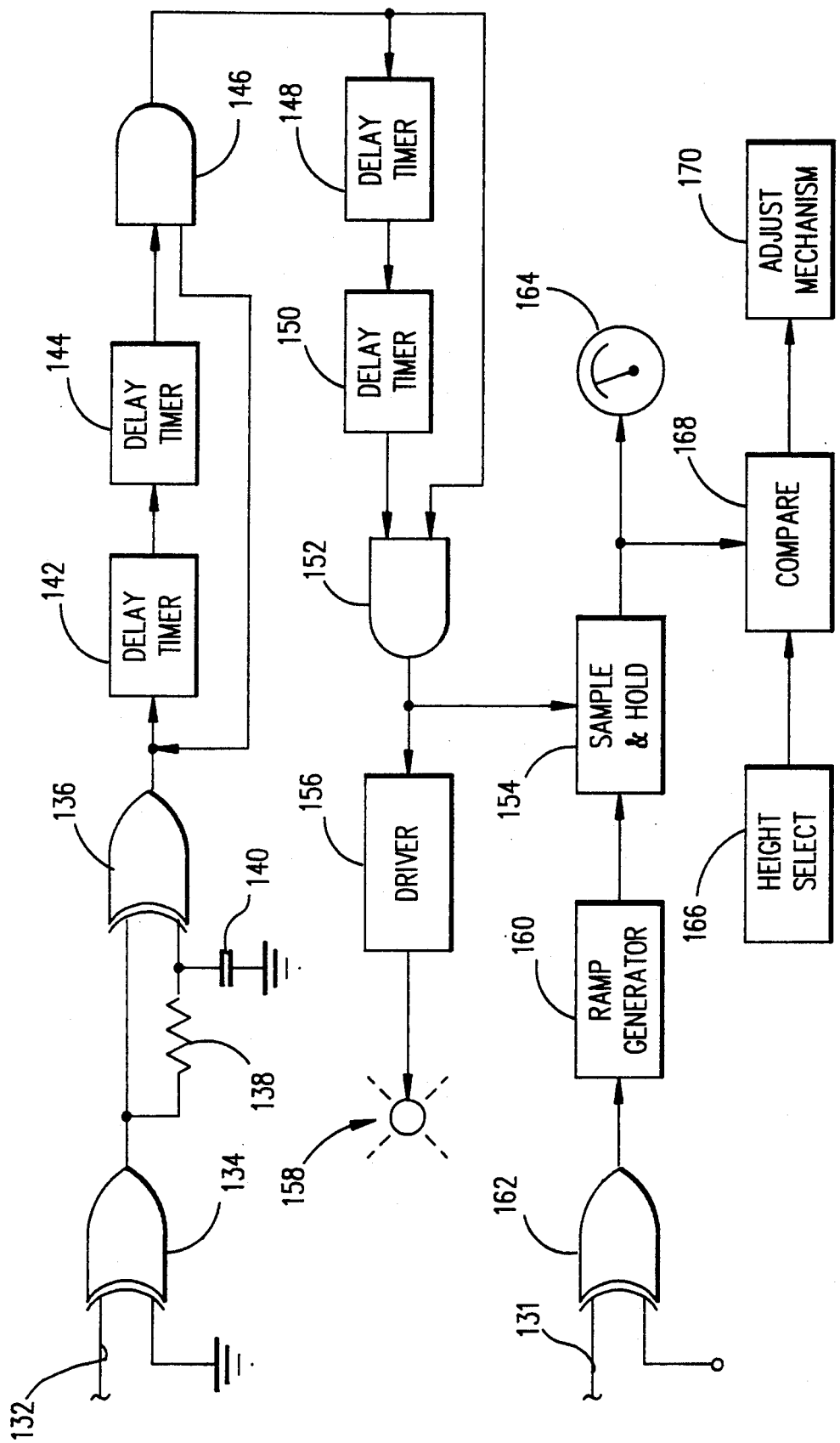

FIGS. 1A and 1B illustrate a first embodiment of a distance measuring device or height sensor which energizes a horn 114 to transmit audible sound waves and analyzes the echoes sensed by the horn to determine the distance between the cutterbar 22 and the ground. The height sensor includes an oscillator 100 and logic circuit means including a counter 102, four OR gates 103–106 and four NANDs 108–111.

Oscillator 100 produces square wave output pulses at a rate of about 5 kc/sec and these pulses are applied to the input of counter 102 and one input of NAND 110.

The counter 102 is a seven-stage binary counter which counts from zero to 127 and then recycles. The outputs of stages $2^5$ and $2^6$ of the counter are connected to inputs of OR 104 while the output of stage $2^4$ of the counter is connected to one input of OR 105. The outputs from stages $2^3$ and $2^2$ of the counter are each connected to one input of OR lo3 and NAND 10B. The outputs from OR 103 and NAND 108 are applied as inputs to NAND 109 and the output of NAND 109 is connected to a second input of NAND 110.

The output of OR 104 is connected to a second input of OR 105 and to the control input of a plurality of switches 116, 118, 122 and 126. The outputs of OR 105 and NAND 110 are connected to inputs of OR 106. In addition, the output of OR 105 is connected via lead 131 to an Exclusive OR 162 shown in FIG. 1B.

The output of OR 106 is inverted by a NAND 111 and applied to a level adjust circuit 112 having its output connected to a piezoelectric transmit/receive horn 114. The purpose of the level adjust circuit 112 is to adjust the magnitude of the driving signals applied to the piezoelectric transducer of horn 114.

The height sensor of FIGS. 1A and 1B operates in a transmit mode during which two bursts of pulses derived from oscillator 100 are applied to the horn 114 to generate two bursts of 5 kc sound signals which are directed toward the ground. At the end of the transmit mode the circuit enters a receive mode during which it listens for the echoes or sound signals reflected from the ground. This is accomplished as follows.

Assume that counter 102 contains a count of zero and the oscillator 100 produces a first output pulse. When the counter contains a count of zero both inputs to OR 103 are at the low level and the output of OR 103 blocks NAND 109 so that the NAND 109 enables one input of NAND 110. The first oscillator pulse thus passes through NAND 110, OR 106 and NAND 111 to the level adjust circuit 112. The level adjust circuit produces an output signal to pulse the sounding element of horn 114.

The output of the level adjust circuit 112 is also applied to switch 116. However, since counter 102 contains a count of zero the OR 104 is producing a low level output signal which blocks all of the switches 116, 118, 122 and 126.

Figure 2:
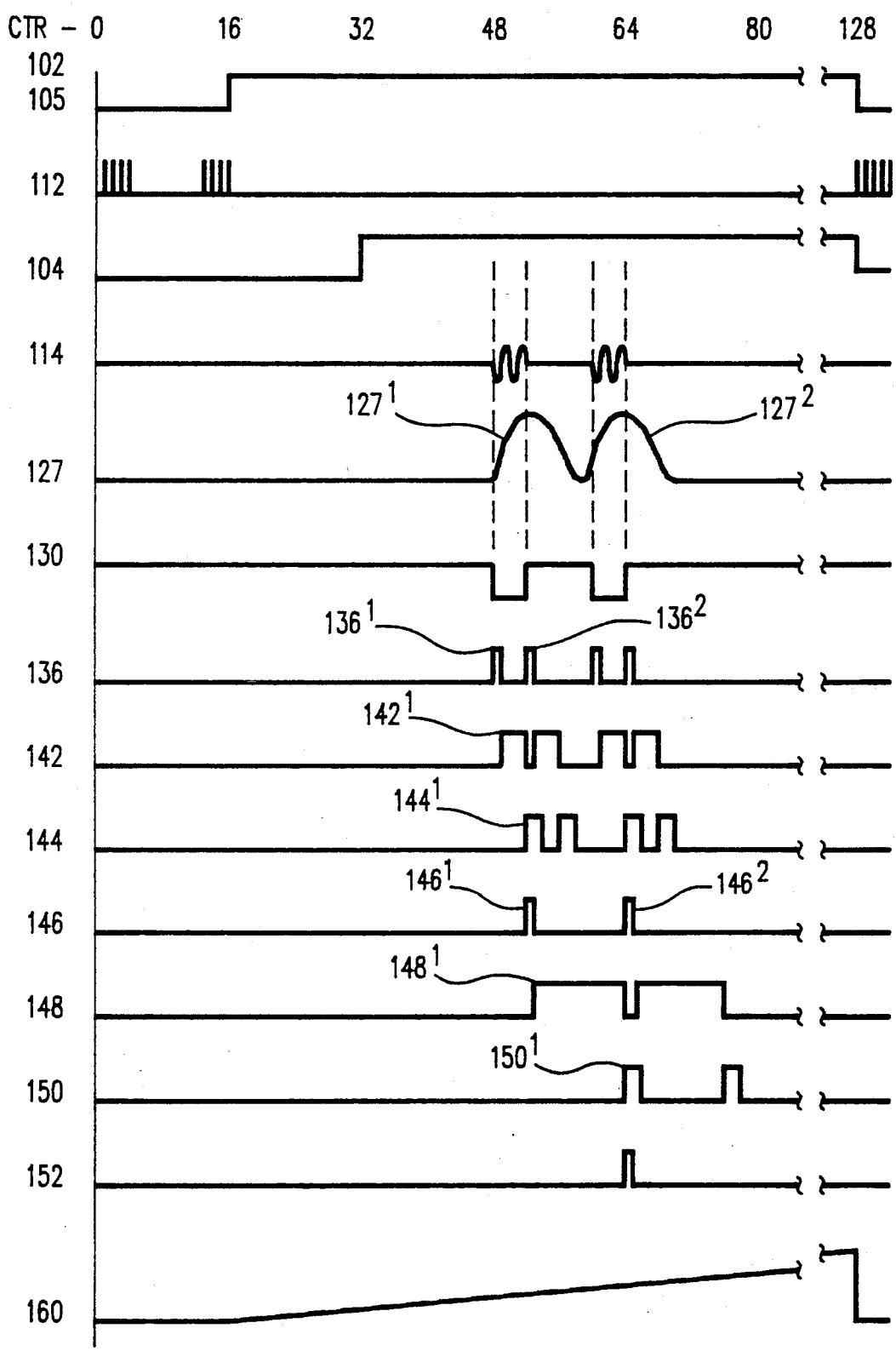
FIG. 2 is a timing diagram illustrating waveforms occurring at the outputs of certain elements in the circuits of FIGS. 1 and 1B.

The second, third and fourth oscillator pulses generated by oscillator 100 also pass through NAND 110, OR 106, NAND 111 and level adjust circuit 112 to pulse the horn 114 with each of the pulses incrementing the count in counter 102. The horn 114 is thus pulsed with a burst of four pulses at the frequency of oscillator 100. The pulses appearing at the output of level adjust circuit 112 and applied to the horn 114 are illustrated in FIG. 2 wherein each waveform is assigned a reference numeral corresponding to the circuit element which produces it.

After the fourth oscillator pulse is generated, the NAND 110 is blocked to prevent passage of succeeding oscillator pulses. With a count of four in the counter 102, its stage $2^2$ produces an output signal through OR 103 to enable one input of NAND 109. Stage $2^3$ of the counter is still reset, hence NAND 108 produces a high level signal to enable a second input of NAND 109. With both inputs enabled, NAND 109 produces a low level signal to block NAND 110 so that NAND 110 no longer passes oscillator pulses.

The fifth through twelfth pulses generated by oscillator 100 are applied to counter 102 to advance the count therein but nothing further happens in the circuit. The twelfth oscillator pulse advances the count to twelve so that stages $2^2$ and $2^3$ of the counter both produce output signals to enable NAND 108. The resulting output from NAND 108 blocks NAND 109 and the output of NAND 109 enables NAND 110. Therefore, the thirteenth pulse generated by oscillator 100 passes through NAND 110, OR 106, NAND 111 and the level adjust circuit 112 to pulse the horn 114. The fourteenth, fifteenth and sixteenth pulses generated by the oscillator are also passed through the NAND 110 to pulse the horn 114. Thus, the horn 114 is pulsed with a second burst of four pulses and emits a second sound burst at a frequency corresponding to the frequency of oscillator 100. Furthermore, the second sound burst is separated from the first sound burst by a predetermined or fixed time interval, this interval being equal to eight cycles of the oscillator 100.

The sixteenth oscillator pulse advances the count in counter 102 to the value sixteen and stage $2^4$ of the counter produces an output signal which passes through OR 105, OR 106 and NAND 111 to block the level adjust circuit 112. Since stage $2^4$ of the counter will remain on until the counter reaches a count of 32, this means that the level adjust circuit cannot pulse the horn 114.

When the count in the counter reaches a count of sixteen the output of OR 105 also produces a signal on lead 131 which is applied through an Exclusive OR 162 (FIG. 1B) to a ramp generator 160. The ramp generator 160 produces an output signal which increases linearly with time as illustrated in FIG. 2. The output of the ramp generator is applied to a sample and hold circuit 154 but the output of the ramp generator is not sampled by the sample and hold circuit at this time.

As the oscillator advances the count in counter 102 from a count of sixteen to a count of 32, nothing happens in the circuit of FIG. 1A. During this interval the sound bursts emitted by horn 114 are travelling toward the ground and the reflected echoes are travelling back from the ground toward the horn 114. When the counter is advanced to a count of 32, stage $2^5$ of the counter produces an output signal through OR 104 to enable switches 116, 118, 122 and 126 of the receiver circuit so that the receiver circuit may detect the returning echoes. The output of OR 104 also passes through ORs 105 and 106 and NAND 111 to keep the level adjust circuit 112 blocked and prevent generation of further sound signals by the horn 114. Between counts of 32 and 127, either counter stage $2^6$ or $2^5$, or both of them, act through OR 104 to keep switches 116, 118, 122 and 124 enabled. These stages, with stage $2^4$, act to block the level adjust circuit 112 during the interval the counter counts from 16 to 128 (equivalent to zero) as indicated by waveform 112 of FIG. 2.

When switches 116 and 118 are enabled, the receiver circuits may respond to sound signals picked up by the horn 114. These sound signals may be either noise from some external source such as machine-generated noise or they may be the echoes of the sound bursts transmitted by horn 114. When the sound signals emitted by horn 114 have been reflected from the ground back to the horn, the horn senses the echoes and produces output signals which pass through switches 116 and 118 to the input of an automatic gain controlled amplifier 120. The output of the amplifier is applied through switch 122 to a band pass filter 124. The filter 124 passes a band of frequencies between 4 and 7 kc. The output of the filter is applied through switch 126 to an envelope detector 127. The echoes of the two sound bursts emitted by horn 114 cause the envelope detector 127 to produce two pulses as indicated by waveform 127 in FIG. 2. The output of the envelope detector is applied to an automatic gain control detector/amplifier 128 and the output of this circuit is applied to the gain control input of the automatic gain controlled amplifier 120.

The output of envelope detector 127 is also applied to a slew rate detector 130. As shown by waveform 130 in FIG. 2, the slew rate detector produces a low level output signal during the interval that the output of the envelope detector 127 is rising. The output of the slew rate detector is applied over a lead 132 to one input of an Exclusive OR 134 (FIG. 1B). The second input of the Exclusive OR is grounded so that the output of this circuit follows the input thereto. The output of Exclusive OR 134 is applied directly to one input of an Exclusive OR 136 and through a resistor 138 to a second input of Exclusive OR 136. The second input is also connected to ground through a capacitor 140.

The output of Exclusive OR 134 is at the high level and the output of Exclusive OR 136 is at the low level until the output of the slew rate detector 130 drops to the low level. When the output of the slew rate detector goes low, the high level output signal of Exclusive OR 134 is terminated. There is a charge on capacitor 140 so Exclusive OR 136 produces a high level output signal until the capacitor is discharged.

Exclusive OR 136 produces a second pulse at the time the output of the slew rate detector returns to the high level. As the output of the slew rate detector goes to the high level so does the output of Exclusive OR 134. The output from Exclusive OR 134 immediately causes the output of Exclusive OR 136 to go to the high level. After an interval of time required to charge capacitor 140, Exclusive OR 136 is blocked thus terminating the second output pulse.

The output of Exclusive OR 136 is applied to a pulse width detector comprising a first delay timer 142, a second delay timer 144 and an AND 146. The output of the Exclusive OR 136 is applied to delay timer 142 and AND 146 and the output of delay timer 142 is applied to delay timer 144 which has its output connected to a second input of AND 146. The delay timers 142 and 144 may comprise portions of a type NE 558 quad delay timer chip. Delay timer 142 is triggered by a negative-going output from Exclusive OR 136 and produces an output signal of fixed duration which is applied to delay timer 144. Delay timer 144 is triggered by a negative-going output from delay timer 142 and delay timer 144 produces an output signal of fixed duration which is applied to one input of AND 146.

The purpose of the pulse width detector is to determine if the width of the output signal from envelope detector 127 is such that it might be the result of a good echo rather than a noise picked up by horn 114. The operation of the pulse width detector may best be understood by considering FIG. 2. At the leading edge of the output pulse from the slew rate detector 130 Exclusive OR 136 produces the pulse $136^1$. This pulse triggers delay timer 142 which in turn produces the pulse $142^1$. The pulse $142^1$ triggers delay timer 144 so that it applies the pulse $144^1$ to the AND 146 thereby enabling one input of the AND. If the output pulse from the envelope detector 127 is the result of sensing a good echo then at the peak of the pulse the output of slew rate detector 130 rises and Exclusive OR 136 produces the pulse $136^2$ which will occur during the interval when AND 146 is enabled by the pulse $144^1$. On the other hand, if the output pulse from the envelope detector 127 is not the result of sensing a good echo signal then the pulse $136^2$ will be closer to or further away from pulse $136^1$ than illustrated in FIG. 2. As a result, pulse $136^2$ will not be applied to AND 146 while it is enabled by the pulse $144^1$. Therefore the AND never produces the pulse $146^1$ indicating that the width of the pulse $127^1$ is such that it should be considered a good echo pulse.

The pulse width detector analyzes the width of the second envelope detector pulse $127^2$ in the manner described above and if its width is such as to indicate a good echo signal, the AND 146 produces a second pulse $146^2$.

The output of AND 146 is connected to a pulse spacing detector comprising a third delay timer 148, a fourth delay timer 150 and an AND 152. The output of AND 146 is connected to the delay timer 148 and input of AND 152. The output of delay timer 148 triggers delay timer 150 and the output of delay timer 150 enables a second input of AND 152. The purpose of the pulse spacing detector is to determine if the time interval between the peaks of pulses $127^1$ and $127^2$ is substantially equal to the time between the sound bursts originally transmitted by horn 114. In the illustrated example, this corresponds to twelve cycles of oscillator 100.

The pulse spacing detector analyzes the time interval between the pulses $146^1$ and $146^2$ produced by AND 146 since these pulses occur at the peaks of the envelope pulses $127^1$ and $127^2$. When AND 146 produces the pulse $146^1$, the trailing edge of the pulse triggers delay timer 148 and it produces the pulse $148^1$ having a fixed duration. The trailing edge of pulse $148^1$ triggers delay timer 150 and it produces the pulse $150^1$ having a fixed duration. This signal enables one input of AND 152. If the AND 146 produces the pulse $146^2$ while AND 152 is enabled by the output of delay timer 150, it is an indication that the envelope pulses $127^1$ and $127^2$ represent good echo pulses. The AND 152 produces an output signal to a sample and hold circuit 154 and a driver 156. The driver 156 energizes an indicator 158 to signal that a good pair of echoes has been received.

When the output of AND 152 enables sample and hold circuit 154, the sample and hold circuit samples the magnitude of the output signal from ramp generator 160 and holds the sample. This signal has been increasing linearly since the second burst of pulses was transmitted hence its magnitude, when sampled, indicates the distance the sound waves travelled and thus the height of horn 114 above the ground. The output of the sample and hold circuit may be applied to an analog indicator 164 to provide a visual indication to the operator of the distance from the cutterbar to the ground.

A manually controllable height select circuit 166 is provided to enable an operator to select a desired cutting height. The height select circuit 166 produces an output signal which is applied to a compare circuit 168. The compare circuit compares the output of sample and hold circuit 154 with the output of the height select circuit 166 and develops a difference signal representing the difference between the desired height of the cutterbar and the actual height of the cutterbar. The difference signal is then applied to an adjust mechanism 170 to adjust the height of the header 20 (FIG. 13A) and thus the height of the cutterbar 22.

A single height sensor circuit as shown in FIGS. 1A and 1B may be utilized to control the height of a cutterbar above the ground and in this case the adjust mechanism may comprise the hydraulic cylinders 26 shown in FIG. 13B. However, to permit control of tilting of the cutterbar about pivot 25, two height sensor circuits as shown in FIGS. 1A and 1B are required and the adjust mechanism must include hydraulic cylinders 28. The hydraulic cylinders 26 and 28 may be controlled by solenoid-actuated valves as explained in U.S. Pat. No. 4,641,490.

Figure 3A:
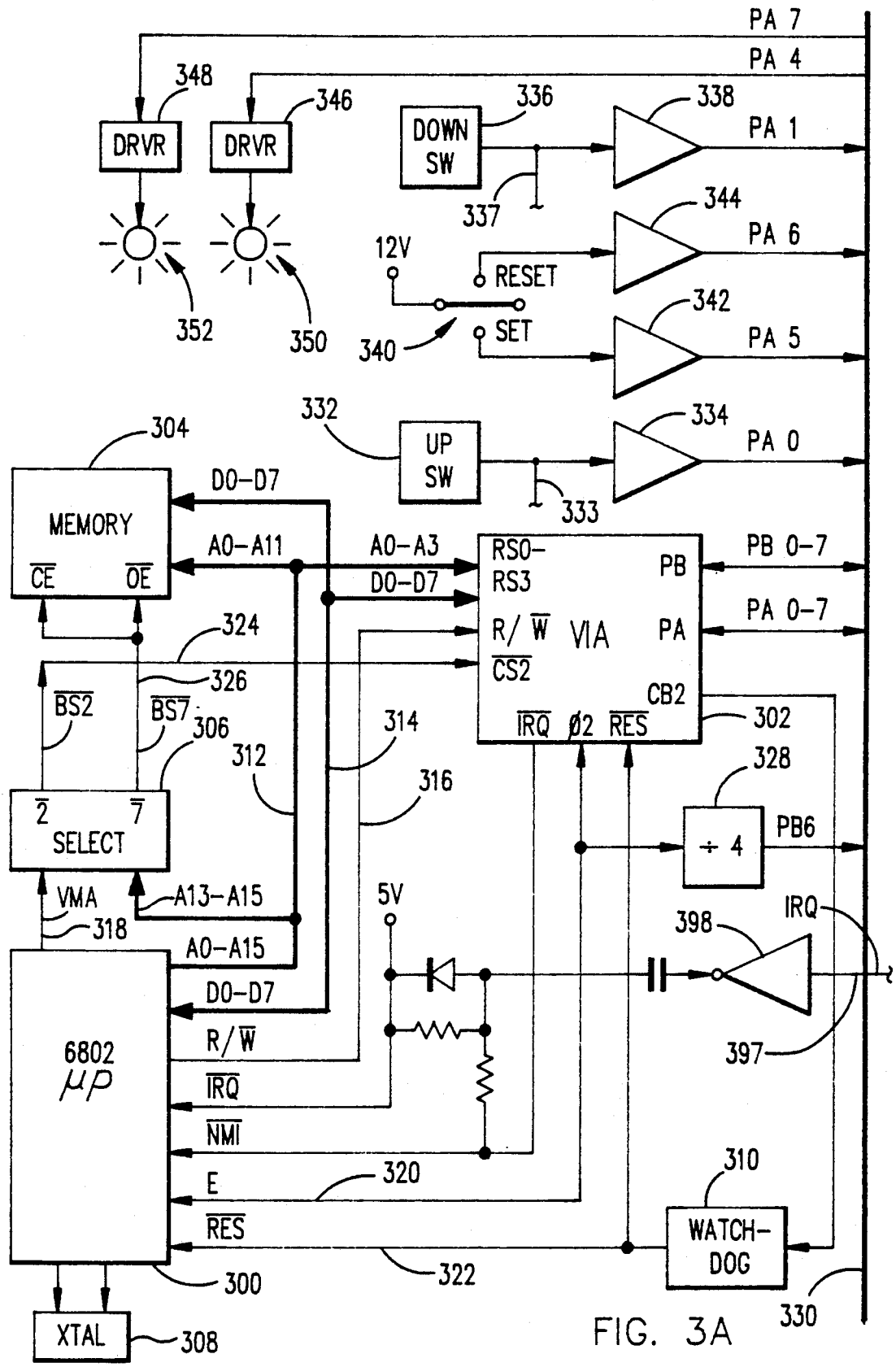
FIGS. 3A and 3B comprise a circuit diagram of a second embodiment of the invention wherein a microprocessor controls the transmission of acoustic signals and analysis of the return echoes.
Figure 3B:
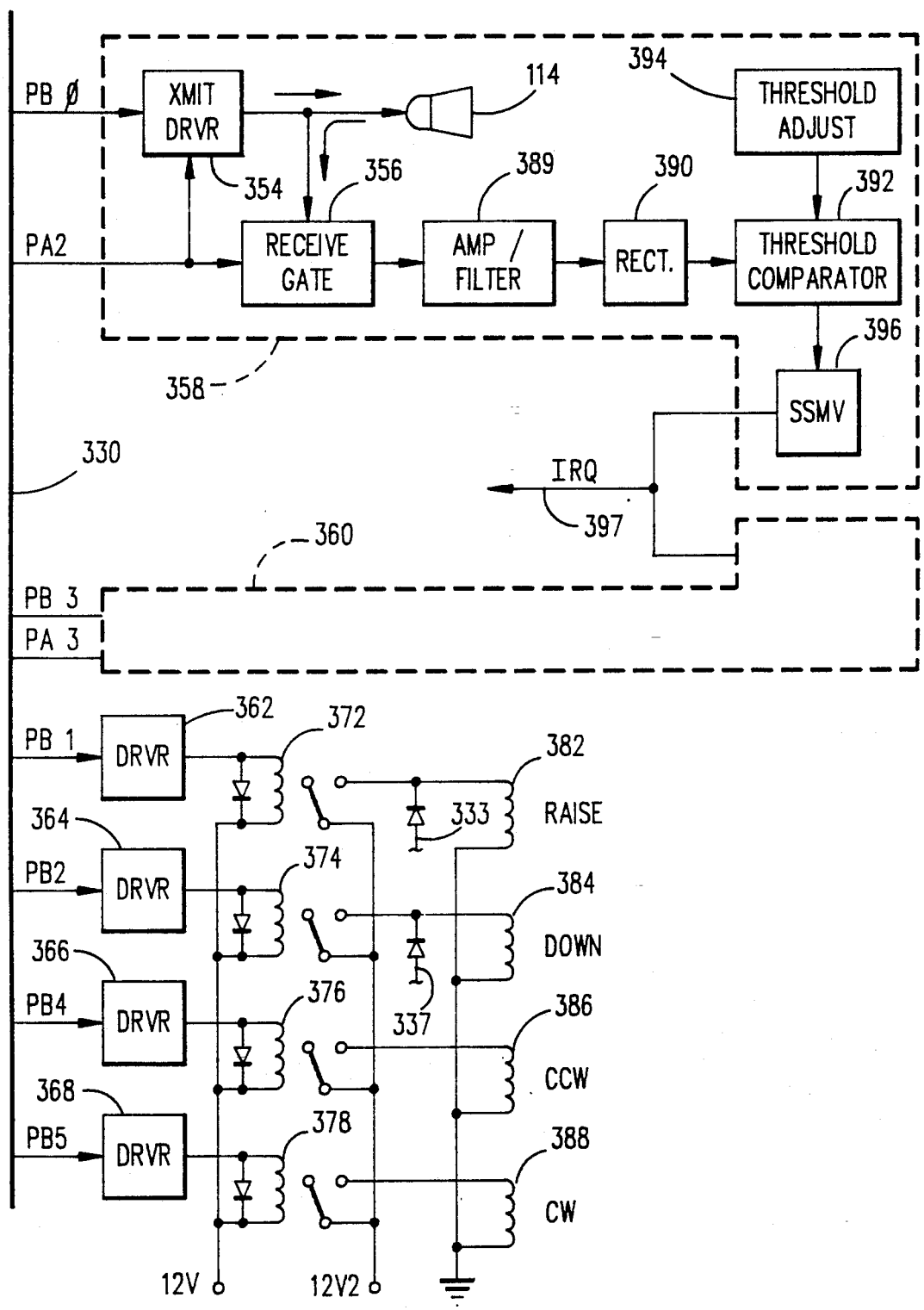

FIGS. 3A and 3B illustrate a second embodiment of the invention wherein a microprocessor system controls the generation of sound bursts by two height sensors and produces output signals for controlling the raising, lowering or tilting of an implement. The microprocessor system includes a type 6802 microprocessor 300, a Versatile Interface Adapter (VIA) 302, a memory 304, an address decoder 306, a crystal oscillator 308 and a watch-dog circuit 310. The microprocessor 300, VIA 302, memory 304 and address decoder 306 are interconnected by a 16-bit address bus 312. The microprocessor, VIA and memory are also interconnected by an 8-bit bi-directional data bus 314.

The microprocessor 300 has eight data input/output terminals (D7-D0) which are connected to data bus 314 and sixteen output terminals (A15-A0) for supplying an address generated within the microprocessor to the address bus 312. When a data register within the microprocessor is loaded with a byte of data for application to the data bus the microprocessor drives the signal R/$\overline{W}$ on lead 316 low and when the data register is to receive a byte of data from the data bus the microprocessor causes the signal R/$\overline{W}$ on lead 316 to be high. When the microprocessor places an address on the address bus it generates the signal Valid Memory Address (VMA) on lead 318 and this signal is applied to the gating input of address decoder 306. The microprocessor outputs a single phase clock onto lead 320 from its E terminal.

Microprocessor 300 has a non-maskable interrupt (NMI) input terminal. A low going signal at this terminal causes the microprocessor to initiate a non-maskable interrupt sequence. Similarly, a low-going signal applied to the interrupt requested terminal (/IRQ) causes the microprocessor to execute an IRQ routine if a mask has not been set. The microprocessor also has a reset input terminal RES and when the signal on lead 322 goes low the registers within the microprocessor are cleared and the microprocessor becomes inactive. When the signal /RES goes to high it causes the microprocessor to begin a restart or initialize sequence.

Address bus bits A15-A13 are connected to input terminals of address decoder 306. Each time the microprocessor outputs a signal on lead 318, it enables address decoder 306 to decode the three address bits and produce a signal on one of the leads 324 or 326 if address bits A15-A13 have the value 2 or 7, respectively. The lead 324 is connected to the CS2 input of VIA 302. The lead 326 is connected to the /OE and /CE inputs of memory 304. When the signal on lead 324 is a logic 0 the memory places on the data bus the 8-bit byte stored at the address specified by the address applied to the memory from the address bus 12.

The VIA 302 may be a type 6522 such as that manufactured by Rockwell or Synertek. It has two 8-bit input/output ports PA and PB. The bit positions of the two ports are individually programmable as either an input or an output. As disclosed at pages 2526-2530 of the publication *IC Master* 1980, published by United Technical Publications, the VIA 302 includes 16 addressable registers, latches and counters. The registers and counters are addressed by applying an address from the four low order bits of the address bus 312 to the register select inputs RS0-RS3. Data is read from, or entered into the registers and counters by the microprocessor through data terminals D7-D0 which are connected to the data bus 314. The VIA is enabled only when the microprocessor outputs a hexadecimal address 2XXX. The high order bits of the address are decoded by address decoder 306 to produce a logic 0 signal on lead 324 which enables the Chip Select (CS2) input of the VIA. The register or counter which is accessed is determined by the four low order bits on the address bus which are applied to register select inputs RS0-RS3 of the VIA. The accessed register or counter is either read from or written into depending upon whether the microprocessor 300 outputs a logic 1 or logic 0 signal, respectively, on lead 316. The $2 input of the VIA is a clocking input and is used to trigger data transfers.

Figure 4:
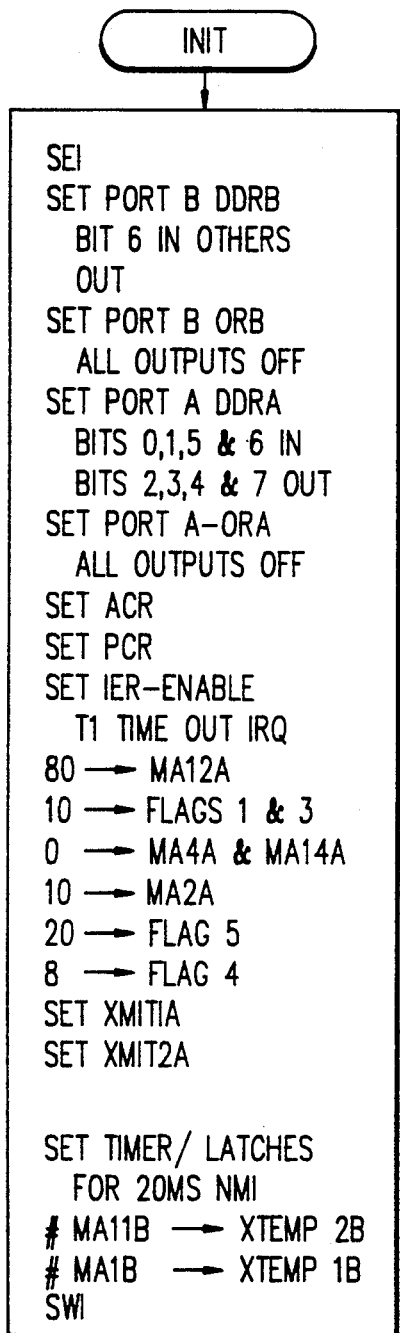
FIG. 4 shows the registers and timers within the VIA illustrated in FIG. 3A.
Figure 4:
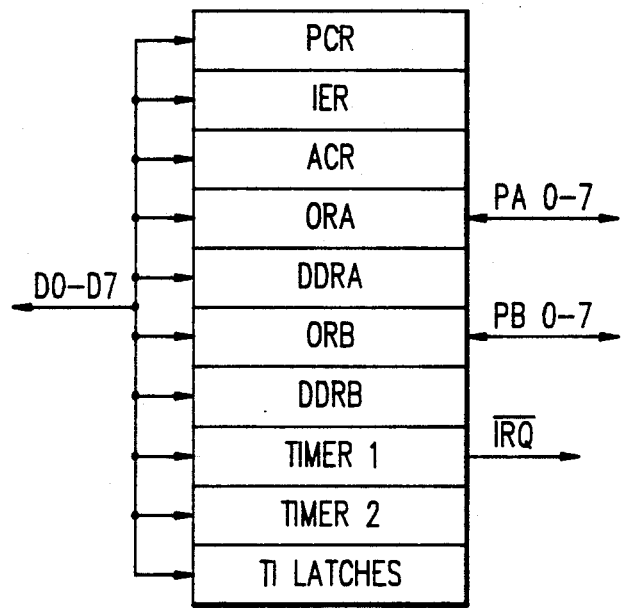

Although VIA 302 has 16 addressable registers, not all of them are used. FIG. 4 illustrates those that are used in the present invention.

All circuits within VIA 306 are reset when the signal /RES on lead 322 is low. The VIA 302 produces an output signal at terminal CB2 which is used to pulse watch dog circuit 310. If the watch dog circuit is not pulsed at periodic intervals it produces the output signal /RES to reset the microprocessor 300 and VIA 302. This permits restarting the system if, for some reason, the program fails to sequence properly.

The PA and PB ports of VIA 302 are connected by two 8-bit buses, indicated collectively by reference numeral 330, to various input or output devices. Port PA, bit positions 0, 1, 5 and 6 are programmed as input ports. An operator controlled UP switch 332 is connected through an amplifier 334 and bus 330 to bit 0. An operator controlled DOWN switch 336 is connected via amplifier 338 and bus 330 to bit 1. The operator may actuate switches 332 and 336 to manually raise or lower an implement as subsequently described. A 3-position, operator-controlled Set/Reset switch 340 has a Set terminal connected via an amplifier 342 and bus 330 to bit 5, and a Reset terminal connected via an amplifier 344 and bus 330 to bit 6. When the switch is moved to the Set position, the current position of the header is stored as a reference position. When it is moved to Reset position, a value corresponding to a header height of about 1⅛" is stored as the reference position. As the harvester moves over uneven terrain the system operates to maintain the cutterbar at a height corresponding to the reference position.

Port PA, bit positions 2, 3, 4 and 7 are programmed as outputs. Bit positions 4 and 7 are connected via bus 330 to drivers 346 and 348, respectively which drive two visual indicators 350 and 352. These indicators provide a visual indication when good echo bursts are received by the horns 114. Bit position 2 is connected via bus 330 to a transmit driver 354 and a receive gate 356 in a height sensing circuit 358. Bit position 3 is similarly connected to a transmit driver and receive gate in a second height sensing circuit 360.

Port B, bit position 7 is not used. Bit position 6 is programmed as an input. The clock frequency signal E produced by microprocessor 300 is divided by 4 in circuit 328 and applied to PB6. In VIA 302, this signal is counted by Timer 2 which develops a count corresponding to the distance between a horn 114 and the ground.

Port B, bit positions 0-5 are all programmed as outputs. Bit position 0 is connected via bus 330 to the transmit driver 354 in height sensing circuit 358 and bit positions 3 is similarly connected to a transmit driver. in the second height sensing circuit 360. Bit positions 1, 2, 4 and 5 are connected via bus 330 to drivers 362, 364, 366 and 368, respectively. Drivers 362, 364, 366 and 368 drive relays 372, 374, 376 and 378, respectively having relay contacts in series with solenoids 382, 384, 386 and 388, respectively. These are the solenoids of solenoid controlled valves which are used as described in U.S. Pat. No. 4,641,490 to actuate hydraulic cylinders 26, 28 (FIG. 13B) and thereby raise, lower or tilt header 20.

The positioning system of FIGS. 3A-3B is provided with two height sensor circuits or channels 358 and 360. Since the circuits are identical, the details of channel 1 only are shown. The channel 358 includes a transmit driver responsive to pulses produced at PB-0 for pulsing a horn 114 so that the horn transmits toward the ground two bursts of audible sound signals, the bursts being separated by a fixed interval of time.

Echoes resulting from the reflection of the sound bursts from the ground, and other extraneous noise picked up by horn 114 cause the horn to produce an electrical output signal which is applied to receive gate 356. A signal from PA-2 disables receive gate 356 and enables transmit driver 354 during the interval sound bursts are transmitted. The logic level of this signal changes to enable receive gate 356 when echoes are due to be received by horn 114.

When receive gate 356 is enabled, any signal produced by horn 114 as a result of sensing noise or an echo of a transmitted sound burst is passed through the gate to an amplifier/filter 389. The amplifier/filter 389 filters out those signals except those in a band between 4 and 7 kc.

The filtered signal is rectified by a rectifier 390 and applied to a threshold comparator 392. A threshold adjust circuit 394 applies a threshold signal to comparator 392. When the magnitude of the signal from rectifier 390 exceeds the magnitude of the threshold signal from the threshold adjust circuit 394, the comparator 392 produces an output signal to trigger a monostable multivibrator 396. In response thereto, the multivibrator produces the signal IRQ on lead 397. This signal is inverted by inverter 398 (FIG. 3A) and applied to microprocessor 300 to cause an interrupt of the microprocessor program.

Figure 11:
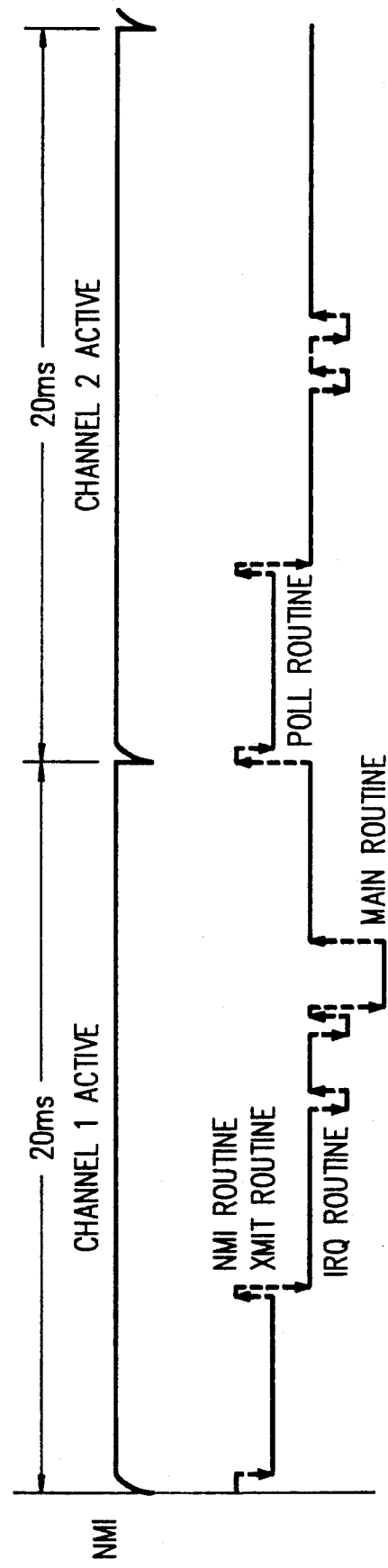
FIG. 11 is a sequence chart illustrating the sequence operation of the invention.

An explanation of the over-all sequence of operation of the system of FIGS. 3A and 3B will be given with reference to FIG. 11 after which the various routines will be explained. When the circuit is turned on, the microprocessor 300 first executes an INITIALIZE routine and sets up TIMER 1 in the VIA 302 to time 20 ms intervals. At the end of each of each interval the timer produces an interrupt request signal which is applied to the NMI input of microprocessor 300. Two 20 ms intervals or NMI cycles are illustrated in FIG. 11. The microprocessor controls channel 1 during the first and alternate cycles and controls channel 2 during the second and alternate cycles. During each cycle the microprocessor executes a sequence of routines as shown in FIG. 11.

In response to each NMI signal the microprocessor interrupts a POLL routine and executes an NMI routine to reset TIMER 1 and check and set certain flags. In addition, an XMIT routine is called. The XMIT routine resets TIMER 2 and sends to the horn 114 of the active channel two bursts of 5 kc signals. When the two bursts have been transmitted, the microprocessor returns to execution of the POLL routine.

The POLL routine is repeatedly executed and is interrupted only to process an NMI or IRQ. It polls the operator switches 332, 336 and 340, blanks the receiver gate 356 of the active channel for a fixed interval after two bursts have been transmitted, and during its execution may call a MAIN routine to send signals to the relays 362, 364, 366 and 368 which control movement of the header 20.

When an echo of a transmitted sound burst is detected by horn 114 of an active channel, the channel generates the IRQ signal on lead 397 to interrupt the POLL routine. The IRQ routine determines if the echo is the first or second echo, and if it is the second echo whether it is properly spaced in time relative to the first echo. If the echo is the second echo and is properly spaced from the first echo, the IRQ routine sets a flag so that upon returning to the POLL routine the MAIN routine will be called. In FIG. 11, the timing sequence is drawn for the condition where two good echoes are detected while channel 1 is active so that the MAIN routine is called, and the spacing between the echoes is not proper when channel 2 is active so that the MAIN routine is not called.

The MAIN routine calculates the error between the reference position and the measured position for the horn for the active channel and sets up the port B outputs to control the raising, lowering or tilting of the header 20 to correct the error. The port outputs continue after the MAIN routine ends and the port outputs a pulse-width-modulated signal to control solenoids 382, 384, 386 and 388 which actuate the header positioning valves.

Upon completion of the MAIN routine the program returns to the POLL routine and repeatedly executes the routine until TIMER 1 again times out so that another signal is applied to the NMI input of microprocessor 300.

Figure 5:
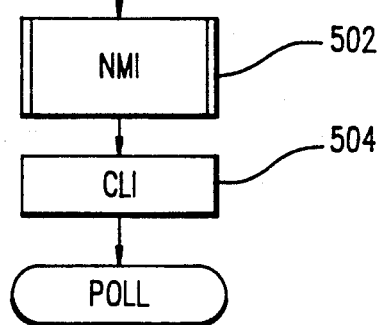
FIG. 5 shows the INITIALIZE routine.

When power is applied to the system the microprocessor 300 executes an INITIALIZE routine as illustrated in FIG. 5. The routine begins by executing an SEI instruction to prevent interrupts. A control byte is then sent to the Data Direction Register B (DDRB) in VIA 302 to set bit 6 of port B as input and all other bits as outputs. Data is then sent to Output Register B (ORB) to turn all of the outputs off. Port A is then initialized by sending a bit of control data to DDRA to set bits 0, 1, 5 and 6 as inputs and the other bits as outputs. Another byte of data is sent to ORA to turn all of the port A outputs off.

A byte of data is then sent to the auxiliary control register (ACR) in VIA 302 to set the TIMER 1 control so that the timer will produce continuous interrupts, that is, an interrupt each time it counts to zero. The byte of data sent to the ACR register also disables latches associated with registers ORA and ORB so that the bits of the registers which are set as inputs follow the signals on the bus 330. The microprocessor then sets the peripheral control register (PCR) in VIA 302 so that CB2 is an output pin. Finally, the microprocessor sets the Interrupt Enable Register (IER) in VIA 302 so as to enable TIMER 1 to generate an IRQ signal each time it counts to zero.

After the inputs and outputs have been initialized, the microprocessor initializes certain flags. Memory address MA12A is set to 80(H) to indicate a good echo from channel 2. A control flag MA4A for channel 1 and a control flag MA14A for channel 2 are cleared. The good-echo-on flag MA2A for channel 1 and Flag 1 and Flag 3 are all set to 10(H). Flags 1 and 3 are set to indicate a change is to be made in the mid-point or reference position of header 20.

Flag 5 is set to 20(H). This flag is used for limiting tilt control and may have any value from 0 to 64. The value 20H corresponds to binary 32 or the center for tilt control.

Flag 4 is then set to indicate that the channel 1 horn is active. Flag 4 is used for controlling receiver blanking for the horn 114 and bit 4 is alternately toggled between 1 and 0 to indicate whether the left horn or right horn is active.

Next, locations XMIT1A and XMIT2A are loaded with values for controlling the ON time and OFF time, respectively, of pulses to be sent to the horn 114.

Next, the microprocessor loads the TIMER 1 latches in VIA 302 with a value for controlling the time between non-maskable interrupts. This value is transferred from the latches into TIMER 1 and counted down to zero at which time the VIA 302 produces the signal /IRQ which is applied to the /NMI input of the microprocessor. Each time the timer counts to zero the value in the latches is again transferred to the counter to repeat the process so that a signal is applied to the NMI input of the microprocessor every 20 ms.

Finally, pointers are stored at locations XTEMP1B and XTEMP2B, these pointers being the base addresses for two data tables, one for each channel.

Figure 6A:
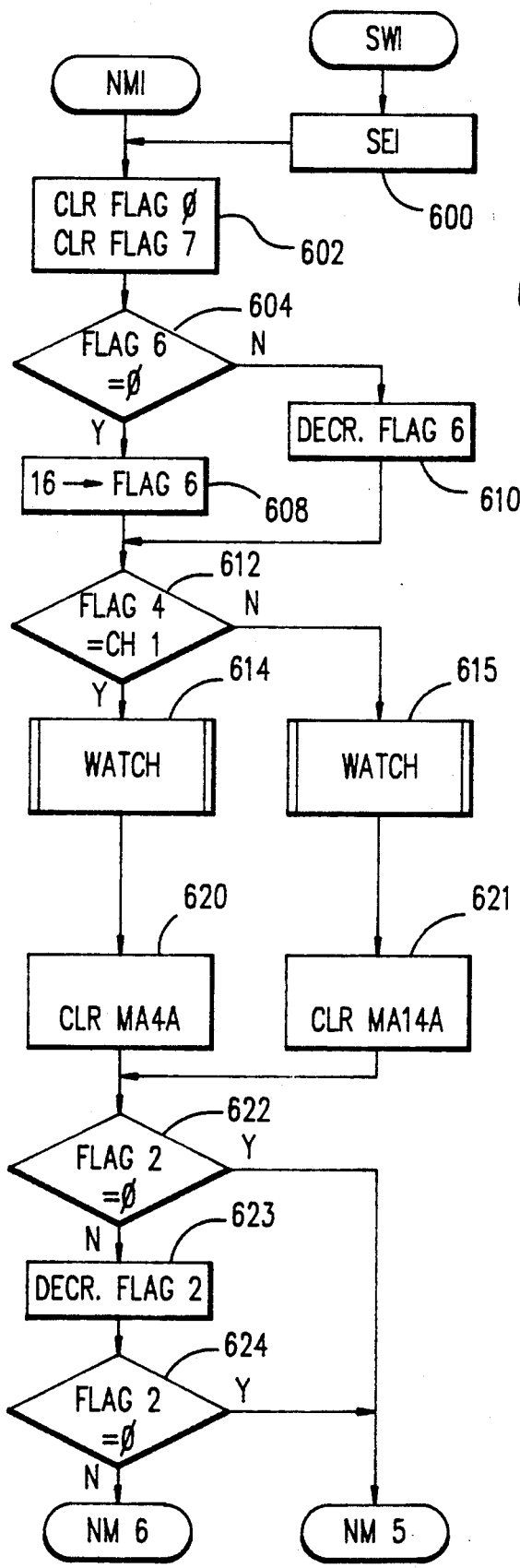
FIGS. 6A and 6B illustrate the NMI routine.

After the circuits have been initialized at step 500, a software interrupt is executed and the program vectors into the NMI routine shown in FIG. 6A where an interrupt mask is set at step 600 and Flag 0 and Flag 7 are cleared at steps 602. Flag 0 is used to count the number of good echo pulses received during a cycle, that is, within the 20 ms interval between two NMI pulses. Flag 7 is used for data store pointer control as subsequently described.

Figure 6B:
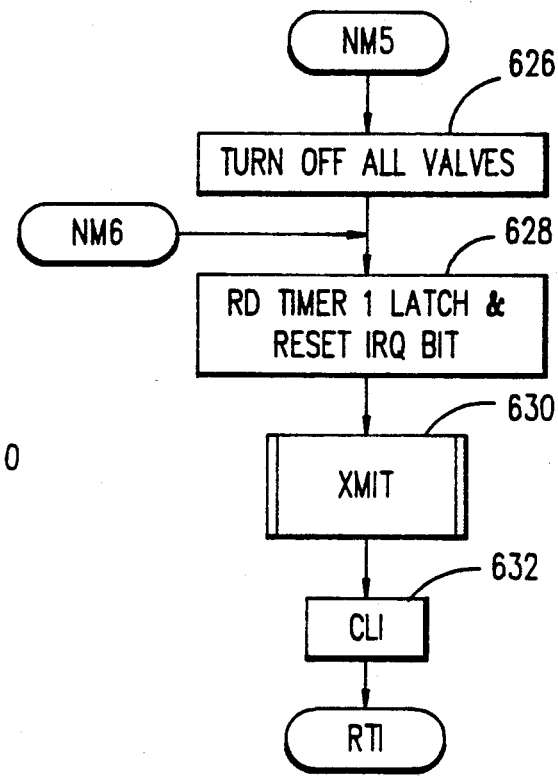

At step 604 Flag 6 is tested. This flag is a system response time loop counter. It is set to a value of 16 and decremented by one every 20 ms when the NMI routine is executed. Flag 6 is sensed during a MAIN routine as subsequently described and prevents changing the output signals to valve control relays 372, 374, 376 and 378 except when the count in the flag is zero. If the test at step 604 shows that Flag 6 is equal to zero then it is restored to a count of 16 at step 606. If Flag 6 is not equal to zero then it is decremented at step 610. At step 612 Flag 4 is tested to see which horn is active. Flag 4 was set during the initialize routine to indicate the channel 1 horn is active so the program moves to step 614 where a WATCH subroutine is executed. The WATCH subroutine is not illustrated since its only purpose is to reset the watch dog circuit 310 and prevent the watch dog circuit from resetting the microprocessor and VIA. At step 620 the horn control flag MA4A for channel 1 is cleared and the program moves to step 622 where it tests Flag 2 for a count of zero. Flag 2 is a loop counter for tolling the on-time of the valve control relays 372, 374, 376 and 378. Since the test at step 622 proves true the program moves to step 626 (FIG. 6B) where the microprocessor sends signals to register ORB in the VIA 302 to deenergize all of the relays 372, 374, 376, and 378.

At step 628 the high order byte from the TIMER 1 latches is read into the microprocessor and then written back to the high order byte of TIMER 1. Thi s causes the low order byte of the latches to be written into the low order byte of the counter and also causes the IRQ bit to be reset. The timer thus begins tolling a 20 ms interval.

Figure 7:
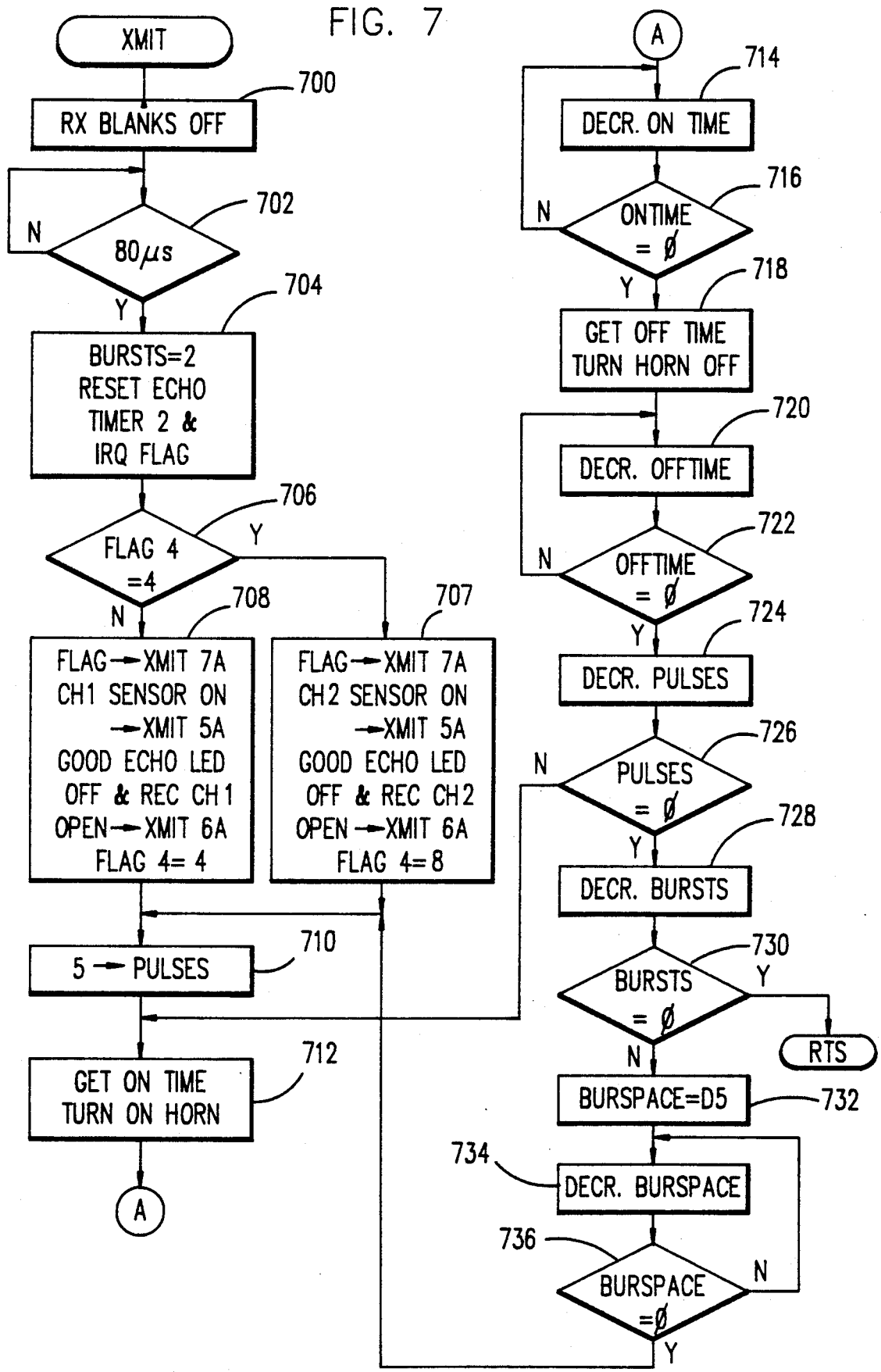
FIG. 7 shows the XMIT routine.

At step 630 the program executes an XMIT routine. The XMIT routine is shown in FIG. 7. Each time the routine is executed it sends a receiver blank signal to both channels, determines whether the channel 1 or channel 2 is to be activated, and transmits two bursts of five pulses to the horn of the active channel at a frequency of about 5 KHz with a fixed delay time between bursts.

The XMIT routine begins at step 700 where register ORA is read into the microprocessor, the data is modified, and returned to the ORA register to turn off the signals PA2 and PA3. At step 702 the microprocessor waits for 80 microseconds to allow time for switching contacts in receive gate 356 to debounce. At step 704 a location BURSTS is loaded with the value 2 to indicate that two bursts of pulses are to be sent. The echo TIMER 2 and IRQ flag are reset and TIMER 2 is started.

At step 706 Flag 4 is tested to see if the channel 1 or channel 2 horn is to be active. The flag was set during the INITIALIZE routine for the channel 1 horn to be active hence the test at step 706 proves false. At step 708 Flag 4 is saved at location XMIT7A and a code for turning the channel 1 receiver on is saved at XMIT5A. In addition, a code for turning the good echo LED off and enabling the channel 1 transmitter 354 is saved at XMIT6A. Flag 4 is then toggled to indicate channel 2.

At step 710 a location PULSES is set to five in preparation for generating five pulses at the 5 kc rate. At step 712 the microprocessor retrieves the pulse on time value which was stored in XMITIA during the INITIALIZE routine. The port B data is then retrieved from ORB register, modified with the contents of XMIT5A and the result sent back to the ORB register to turn on the transmit driver 354. At step 714 the on time value in XMIT1A is decremented and at step 716 it is tested for a zero value. Steps 714 and 716 are repeated until the on time value has been decremented to zero. The transmit driver is then turned off at step 718. Thus, the transmit driver 354 is enabled to apply to the channel 1 horn 114 a pulse whose duration is determined by the value originally stored in XMIT1A.

At step 718 the value of pulse off time is retrieved from location XMIT2A where it was stored during the INITIALIZE routine. The port B data is read from the ORB register, modified and returned to the ORB register to turn off the transmit driver 354. At step 720 XMIT2A is decremented and at step 722 it is tested for a zero value. Step 720 and 722 are repeated until the off time has been decremented to zero. The program then moves to step 724. One pulse cycle has now been completed so at step 724 the value in PULSES is decremented. At step 726 PULSES is tested for a zero value and if it is not zero the program returns to step 712.

The loop between steps 712 and 726 is repeated fiVe times with the transmit driver 354 being enabled during execution of steps 714 and 716 and disabled during execution of steps 720 and 722. Thus, five pulses are applied to the channel 1 horn 114. After the fifth pulse is transmitted, the test at step 726 proves true and the value BURSTS is decremented at step 728. This location was loaded with the value two at step 704. At step 730 the value in BURSTS is tested and since it is not zero location BURSPACE is loaded at step 732 with a value representing the desired interval of time between bursts. At step 734 BURSPACE is decremented and at step 736 is tested for a zero value. Steps 734 and 736 are repeated until BURSPACE is equal to zero indicating that the desired interval of time has elapsed. The program then branches back to step 710 and the loop between steps 710 and 730 is repeated in order to generate a second burst of five pulses for application to the channel 1 horn. On the second time through the loop the test at step 730 proves true and the program returns to the NMI routine (FIG. 6B) where the interrupt mask is cleared at step 632. The program then returns to the INITIALIZE routine (FIG. 5) where it waits for a non-maskable interrupt. The NMI is generated when TIMER 1, previously set at step 628, counts to zero. The program branches to the NMI routine of FIG. 6A for the purpose of transmitting two more bursts of pulses, this time to the horn 114 of channel 2. The NMI routine is executed as described above with the following exception. Since Flag 4 was set to indicate channel 2 at step 708 when the XMIT routine was executed, the test at step 612 proves false so that steps 615 and 621 are executed. These steps correspond to steps 614 and 620 previously described except that storage locations for channel 2 rather than channel 1 are used.

When the NMI routine branches to the XMIT routine at step 630, the XMIT routine (FIG. 7) is executed as previously described except that the test at step 706 proves true so that step 707 is executed. XMIT5A and XMIT6A are loaded with values to control the channel 2 receive gate and good echo LED. Thus, during this execution of XMIT two bursts of five pulses each are transmitted to the horn 114 for channel 2 with the bursts being separated by a fixed interval of time as defined by BURSPACE.

Figure 8A:
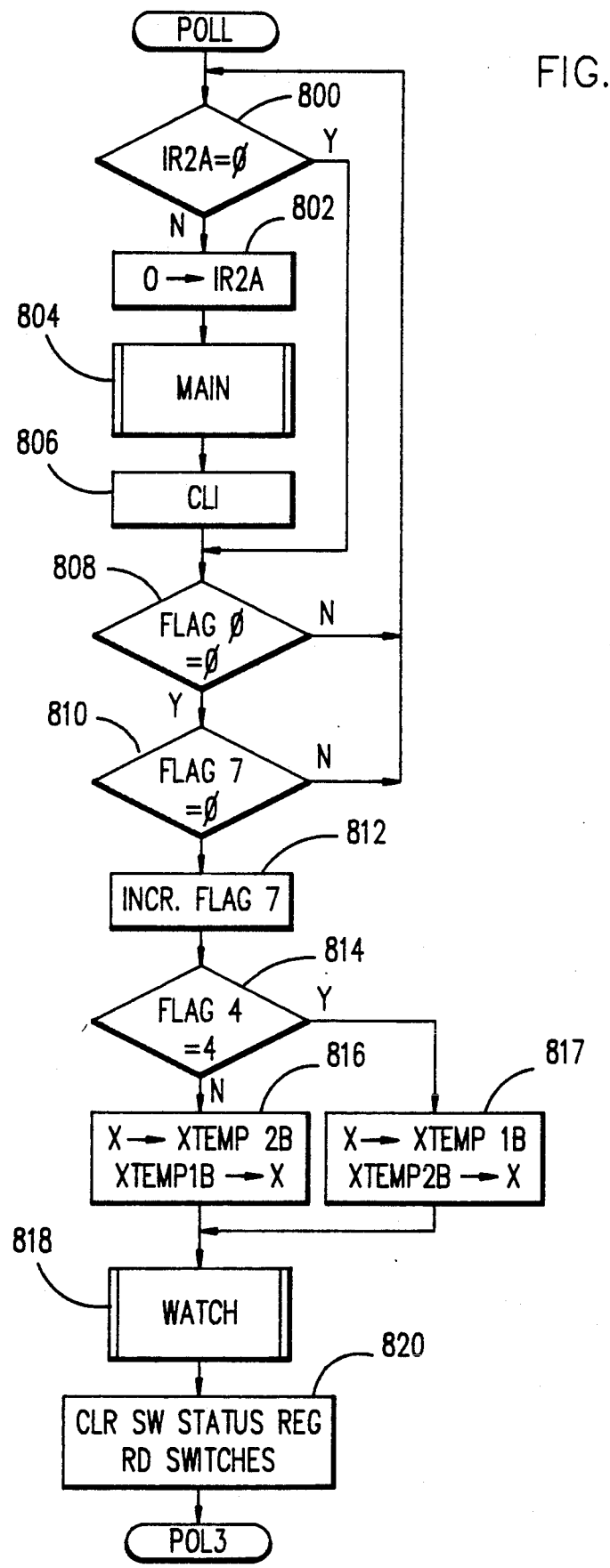
FIGS. 8A and 8B show the POLL routine.
Figure 8B:
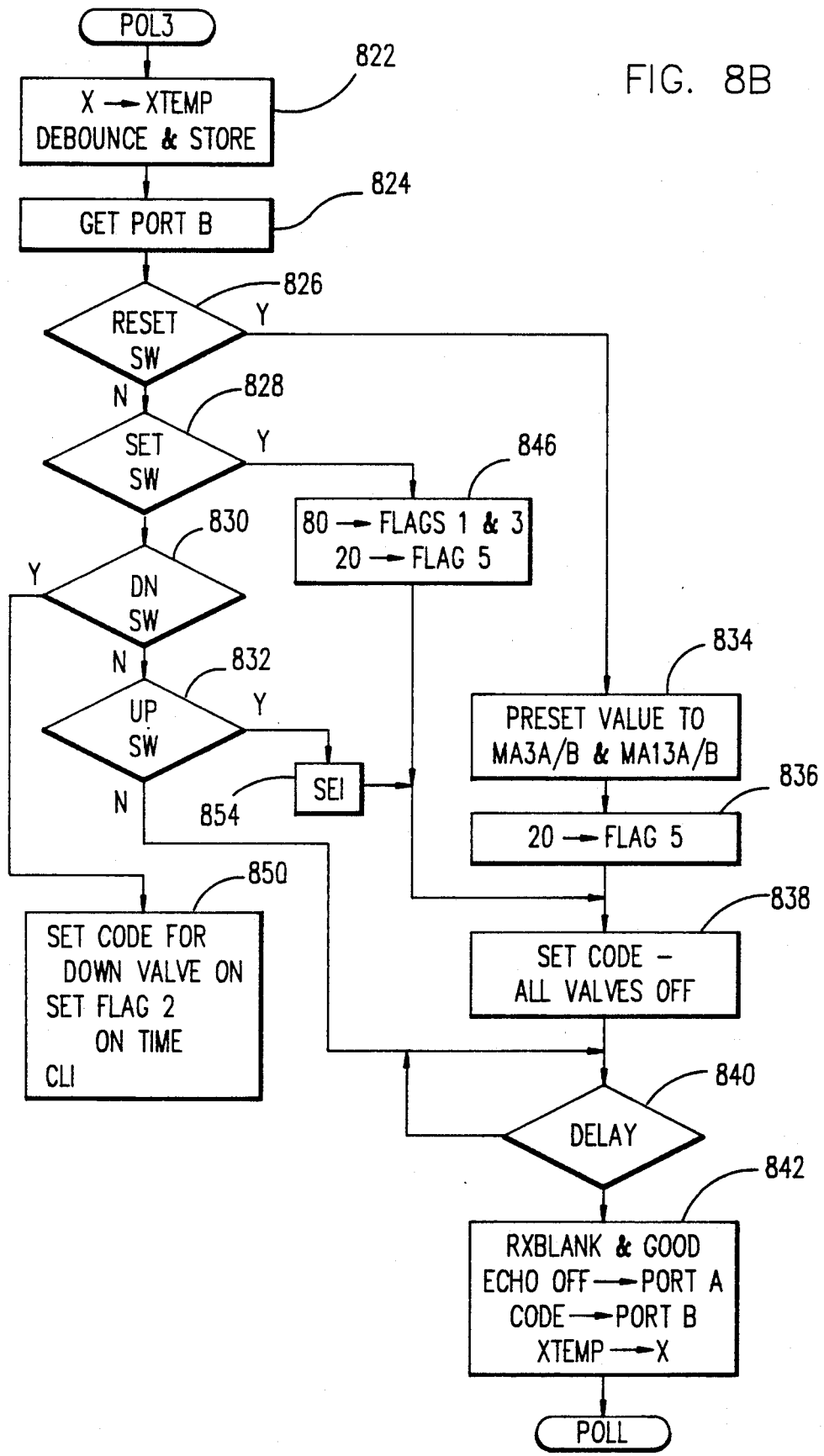

After the XMIT routine is executed at step 630, the interrupt mask is cleared at step 632 of the NMI routine and the program again returns to the INITIALIZE routine of FIG. 5 where it then jumps to the POLL routine illustrated in FIGS. 8A and 8B. At this point, the initialization has been completed. The system is waiting for the echoes of the two sound bursts sent out by the channel 2 horn.

Once the INITIALIZE routine is completed, the POLL routine is initiated. This routine checks the operator switches 332, 336 and 340 to determine which, if any, of the switches has been actuated. The routine then steers the program to the proper action depending upon the switch which is actuated. The POLL routine also checks an IRQ flag which is set in an IRQ routine as subsequently described to indicate that a horn 114 has sensed the echo of a sound burst. If the flag is set the POLL routine jumps to a MAIN routine where control values are computed and output signals are developed for raising, lowering or tilting the header 20. The POLL routine is interrupted every 20 ms when TIMER 1 times out and sends a signal to the /NMI input of microprocessor 300. After the NMI routine is executed the program returns to the POLL routine at the point where it was interrupted.

The POLL routine begins at step 800 by checking the interrupt request flag IR2A. Assume for the moment that the echoes of two sound bursts transmitted by the channel 2 horn have not yet been received. The test at step 800 proves true and the program branches to step 808 where Flag 0 is tested. This test also proves true since Flag 0 was reset at step 602 when the NMI routine was executed. At step 810 Flag 7 is tested and since it was also reset at step 602 when NMI was last executed the program advances to step 812 to set Flag 7. This flag permits execution of the POLL routine beyond step 810 only once for each execution of the NMI routine. At step 814 Flag 4 is tested to determined if the channel 1 or channel 2 sensor is active. If the channel 1 sensor is active then step 816 is executed to save the contents of the index register X in microprocessor 300 and load the register with the pointer to the base address of a table which stores data for channel 1. On the other hand, if the test at step 814 shows that the channel 2 sensor is active then step 817 is executed to save the contents of the X register and load it with a pointer to the base address of the table which stores data for channel 2.

After the WATCH routine is executed at step 818 the program moves to step 820 where a Switch Status register is cleared. Next register ORA is read to determine which inputs to Port A of the VIA 302 are active. The microprocessor saves the contents of the X register at step 822 and then executes a switch debounce routine during which one bit of the Switch Status register is set depending upon which, if any, of the switches 332, 336 or 340 is actuated.

At step 824 the Port B data in register ORB is brought into the microprocessor for possible subsequent modification. At step 826 a test is made to determine if the set/reset switch was set to the reset position. If it was, the program branches to step 834 where a predetermined reference or mid-point value is stored at locations MA3A/B and MA13A/B. This mid-point value is subsequently used to cause the system to control the cutterbar to a height of about 1.25 inches above the ground until the operator sets up a different mid-point value. At step 836 the tilt control Flag 5 is restored to its midpoint value and at step 838 the data in output register ORB is read into the microprocessor and modified so that when it is subsequently returned to the ORB register it will turn off all of the header control valves.

At step 840 the program waits for 1.758 ms. This allows the PA2 or PA3 signal to block the receive gate 356 for the active horn for an interval after the second of the two bursts are transmitted by the horn.

At step 842 register ORA is read into the microprocessor and modified with the contents of locations XMIT7A and XMIT6A. This modifies the good echo LED bit and the receiver blank bit so that when the data is returned to the ORA register the signal PA2 (or PA3) enables the receive gate of the active channel while the signal PA4 (or PA7) turns off the good echo indicator 350 (or 352) for the active channel. The Port B data developed at step 838 is then returned the ORB register so that signals are sent out to turn off all of the header control valves. The POLL routine then returns to step 800 in FIG. 8A.

Returning to step 826, (FIG. 8B) if the test shows that the reset switch is not set, then the program moves to step 828 to see if the set/reset switch is in the set position. If it is, the program branches to step 846 where Flags 1 and 3 are set to indicate a new mid-point for the header height is required. These flags are sensed during execution of the MAIN routine as subsequently described to develop the new mid-point value. Step 846 also restores the tilt control Flag 5 to its mid-point value. The program then proceeds to steps 838, 840 and 842 as previously described.

If the test at step 828 proves false then step 830 is executed to determine if the DOWN switch 336 was the activated switch. If it was, the program branches to step 850 where the valve port data obtained at step 824 is modified so that when it is returned to the ORB register at step 842 the signal on lead PB2 actuates the down valve. Flag 2 is set to a value FA (250) to indicate the time the down valve is to be on. Flag 2 is decremented once during each NMI cycle hence the value entered in Flag 2 represents an energization interval of 5 seconds. This interval is sufficient to permit movement of the header to the position defined by the mid-point value even though the operator may release the DOWN switch. The interrupt mask is cleared and the program proceeds to steps 840 and 842 as previously described.

If the test at step 830 proves false the program executes step 832 to determine if the UP switch 332 was actuated. If it was, an interrupt mask is set at step 854 after which the program proceeds to execute steps 836, 838, 840 and 842 as previously described. The program thus returns to the POLL routine with all valves off and the IRQ mask set to prevent interrupts from the channels. This totally disables automatic control of the header and the operator must actuate the DOWN switch to resume automatic control.

If the test at step 832 proves false then the program moves directly to step 840 and after the delay executes step 842 before returning to step 800. Since no switches have been set the routine ends without changing the valve control output signals.

The steps of the POLL routine described above are repeatedly executed, being interrupted only every 20 ms to execute the NMI routine when TIMER 1 times out, and once each time one of the channels senses an echo and generates the IRQ signal on lead 397.

When the IRQ signal occurs it causes the microprocessor 300 to execute the IRQ routine shown in FIG. 9. The IRQ routine begins at step 900 by reading the count in the echo TIMER 2 and resetting it so that it may begin counting another interval. Since TIMER 2 counts down, the data read from the timer is complemented to obtain its true value. At step 902 Flag 0 is tested. This flag is cleared at the beginning of an NMI cycle and keeps track of whether none or one previous echo pulse has been processed. If the first echo pulse is being processed, the test at step 902 proves true and the program moves to step 904 where Flag 0 is set and the data obtained from TIMER 2 is stored at locations IR1A and IR1B. The program then returns to the POLL routine.

Figure 12:
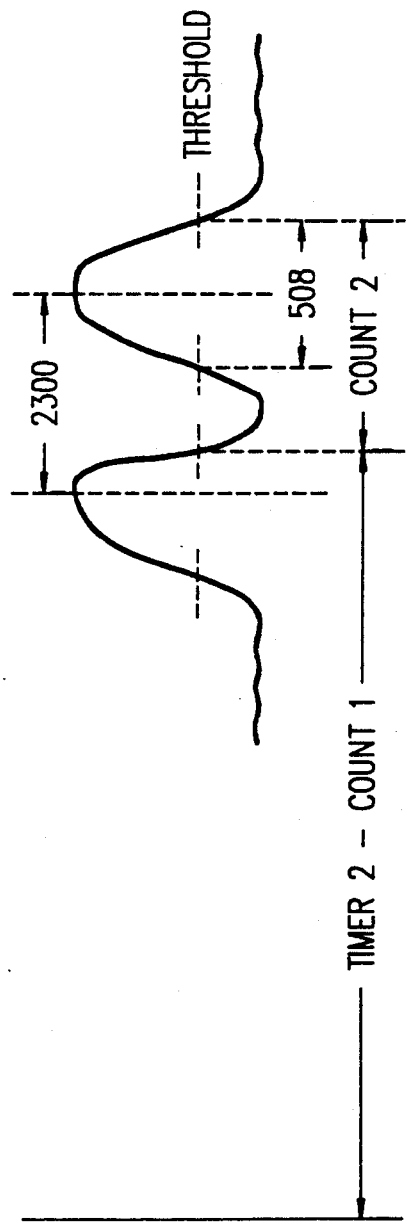
FIG. 12 is a timing diagram illustrating how the spacing between echo pulses is determined.

When the second of a pair of echo pulses is received, the IRQ routine is executed a second time. Timer 2 is again read and reset and the data read from the timer is complemented. The test at step 902 proves false so the program moves to step 906 where the new data from TIMER 2 is pushed onto the stack. The new data is then added to the previous data saved at step 904. The sum is saved on the stack for later use and the most recent data from TIMER 2 is retrieved. This data is a count representing the interval of time elapsing between the first and second echo bursts of a pair. Referring to FIG. 12, the interval should be 2300 microseconds but a tolerance of plus or minus 254 counts is provided. At step 908 the data is subtracted from 2554 to see if the time between pulses is too great. If it is, the program returns to the POLL routine. If it is not too great then it is checked to see if the time is too small. This is accomplished at step 910 where the value 254 is subtracted from the difference obtained at step 908. If the spacing between the two echoes is too small, then the program returns from step 910 to the POLL routine. If the spacing between the two echo pulses is within tolerance limits, the program proceeds to step 912 where it increments location IR2A before returning to the POLL routine. The next time the POLL routine returns to its starting point the test at step 800 will prove false and at step 802 the Flag IR2A is cleared. The POLL routine then branches to the MAIN routine which computes the header position and determines what corrections should be made. After the MAIN routine is executed the program returns to the POLL routine at step 806 to clear the interrupt mask. The POLL routine then continues as previously described.

Figure 10B:
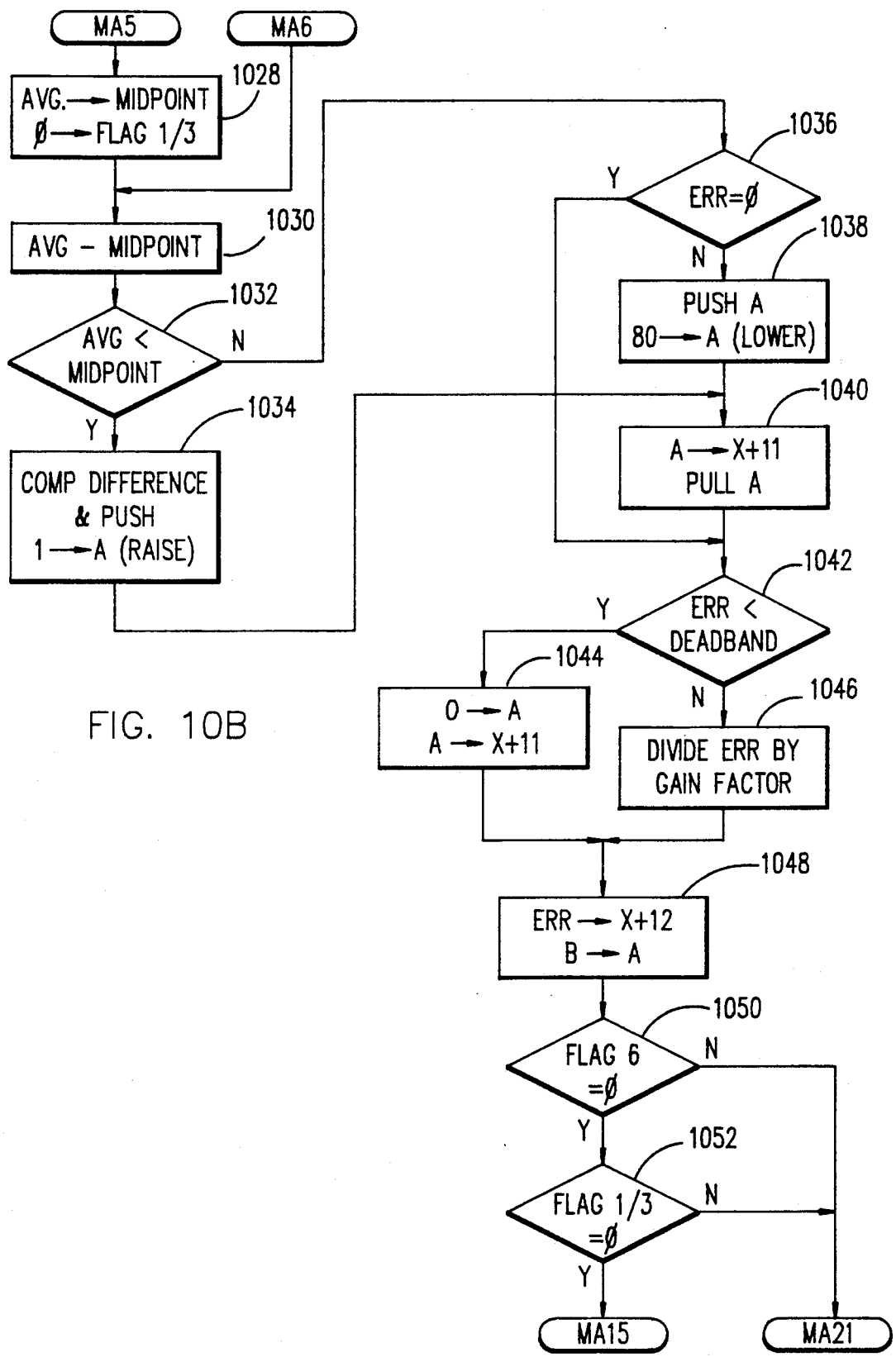
Figure 10C:
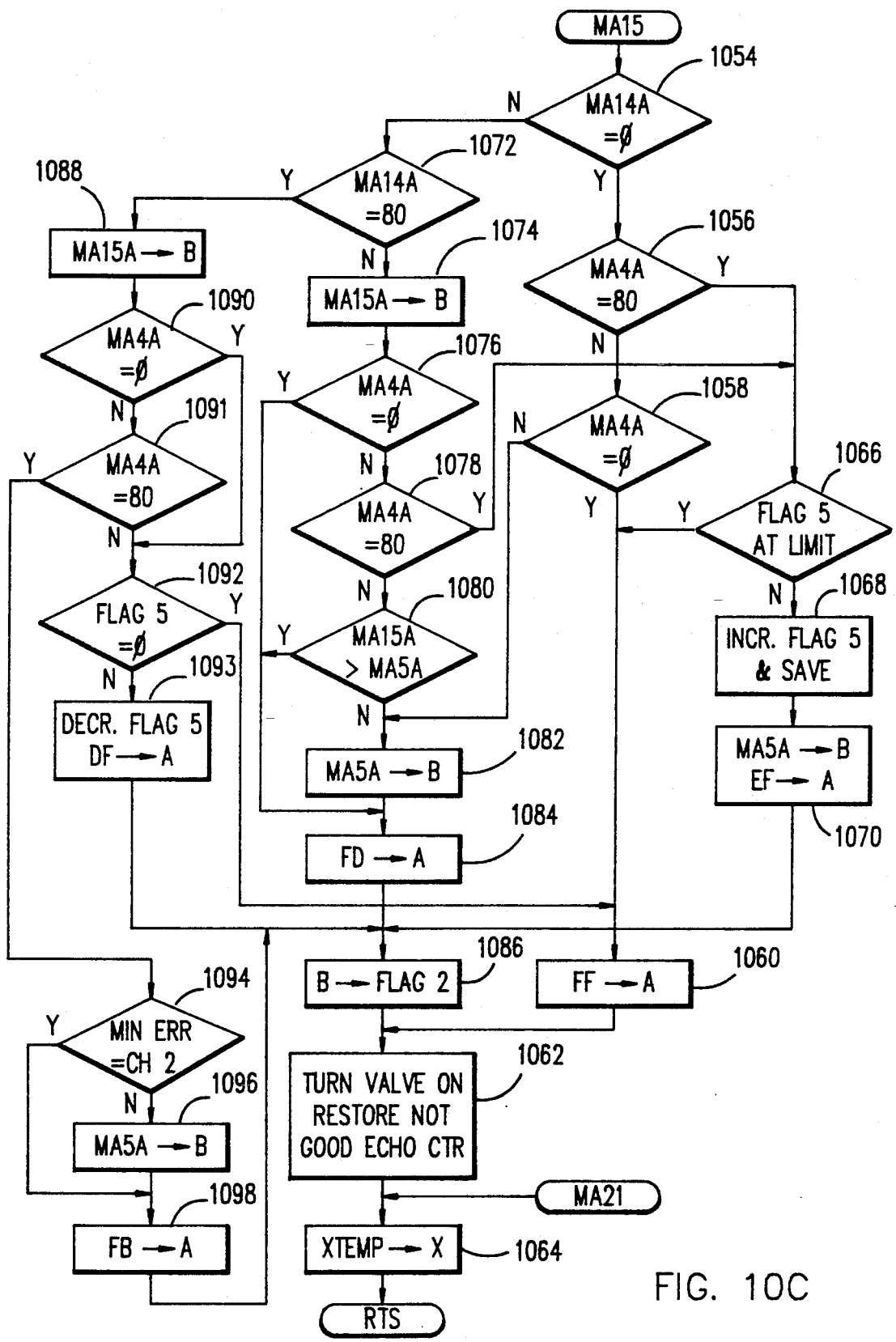

The MAIN routine illustrated in FIGS. 10A–10C is called from the POLL routine only if two good echoes are received by a horn 114 during the interval between two NMI signals generated by TIMER 1. When the second signal causes the IRQ routine to be executed a second time, the Flag IR2A is set at step 912. When the POLL routine next executes step 800 it finds the flag set and calls the MAIN routine.

The purpose of the MAIN routine is to determine the direction and size of an error between a desired cutterbar height (the mid-point) and the actual height as sensed by the height sensors 358 and 360. A dead band is provided so that no control is exercised if the error is relatively small. If the error exceeds the dead band the MAIN routine computes the gain and turns on the valve necessary to move the header toward the midpoint. The routine takes the average of four height counts measured by the echo TIMER 2 and this average value is compared with the mid-point value to determine the error. The MAIN routine is also utilized to revise the mid-point if the operator has moved the set/reset switch 340 to the set position.

Although the MAIN routine computes an error value each time it is executed, it sends data to the ORB register to control the header positioning valves only on every 16th cycle. The reason for this is the response time of the height positioning valves and mechanism for the header.

When the MAIN routine is entered the index register X in the microprocessor 300 contains a value which points to the address at which the height count from TIMER 2 was last stored for the active channel. It is thus possible to determine from the value in the X register when four height counts have been stored for one of the height sensors. At step 1000 the X registered is compared with the value for the address of the fourth count for channel 1. If they are equal then the program branches to step 1002 where it decrements X by 6 to restore it to the first height count address.

If the test at step 1000 proves false then step 1004 is executed to see if the X register contains the value of the address at which the fourth height count for channel 2 is stored. If four height counts have been stored for the channel 2 the program branches from step 1004 to step 1002 to restore the pointer.

If the test at step 1004 proves false then the X register is incremented by two at step 1006 so that it points to the address at which the next height count will be stored. Step 1008 stores the value in the X register developed at step 1002 or 1006 at memory location XTEMP.

Flag 4 is tested at step 1010 to determine whether channel 1 or channel 2 is being processed. If Flag 4 equals 8 then the program executes step 1012 to load into the X register the base address for the channel 2 data. On the other hand, if Flag 4 is not equal to 8 the program executes step 1014 to load the X register with the base address of the channel 1 data.

At step 1016 register ORA is modified to set the good echo LED indicator bit thereby turning on the indicator 350 or 352 depending upon which is the active channel.

At step 1018 the microprocessor computes the average of the four counts stored for the active channel. This average represents the present height of the header.

The microprocessor then accesses location $X+13$ to obtain the mid-point change Flag $\frac{1}{2}$ for the active channel. The flag is tested at step 1020 and, assuming for the moment that the operator has not requested a change, the program moves to step 1030 (FIG. 10B) where the midpoint value is subtracted from the average count value to determine the error value. The difference determines whether the header 20 is to be raised or lowered, or no change made in order to bring the height of the header to the desired height represented by the midpoint value. At step 1032 the difference is tested. If the average count is less than the mid-point value the header must be raised. At step 1034 the difference is pushed onto the stack and the value 1 is entered in the A register. At step 1040 the A register is transferred to a location X+11 which is the raise/lower/null flag location for channel 1 or channel 2, depending on which channel is active. These flags may have the value 0, 1 or 80, and if the value is 1 then it designates that the header must be raised.

If the test at step 1032 shows that the average count is not less than the mid-point value then step 1036 is executed to determine if the difference is zero. If it is not, then the average count must be greater than the mid-point value and the header must be lowered. Steps 1038 and 1040 are executed to set the control flag at location MA4A or MA14A to the value 80(H) thereby indicating that lowering is required.

If the test at step 1036 shows that the difference between the average count and the mid-point value is zero then there is no error in the position of the header. The program moves directly to step 1042. When the program reaches step 1042, either from step 1036 or 1040, the A register holds the error value, that is, the difference between the average count and the mid-point value. Step 1042 compares the error value with a deadband value (192) because no header movement is initiated unless the error exceeds a certain minimum value. If the error is less than the deadband value step 1044 is executed to set the control flag MA4A or MA14A to zero. If the error is greater than the deadband then step 1046 divides the error by a gain factor of 32.

Step 1048 stores the gain factored error at location X+12 (MA5A or MA15A). Flag 6 is then tested at step 1050 to see if it is zero. If it is not then no control may be initiated. The program moves to step 1064 (FIG. 10C) to restore the X register before a return is made to the POLL routine.

If the test at step 1050 shows Flag 6 to be zero then control may be carried out. Step 1052 checks the flag at location X+11 to see if control is required. If no control is required then the program branches to step 1064 to restore the X register before returning to the POLL routine.

If the test at step 1052 proves true then control is required and the program must determine which type of control, raise, lower, tilt right, or tilt left is required. At step 1054 the control flag (MA14A) for channel 2 is tested to see if it is zero. If it is, then step 1056 tests the control flag (MA4A) for channel 1 to see if it specifes a lowering operation. If it does, then a tilt left operation is required since the channel 1 horn is on the left side of the header. The program tests Flag 5 at step 1066 to see if it holds a count of 64. If it does not then the header is not at its limit of left tilt and may be tilted further. Flag 5 is incremented and saved at step 1068. Step 1070 brings the gain factored error value for channel 1 into the B register and loads the A register with a code for turning on the valve for tilting the header to the left. Step 1086 saves the gain factored error value at Flag 2 to control the valve on-time. This flag is subsequently tested and decremented at steps 622 and 623 each time the NMI routine is executed and controls how long the valve is actuated.

At step 1062 the code entered in the A register at step 1070 is sent to ORB to turn the valve on and the X register is restored at step 1064 before returning to the POLL routine.

If the test at step 1056 proves false then the left end of the header must be raised or no control exerted and this is determined at step 1058. If the channel 1 control flag is zero no control is required and the program moves to step 1060 where the A register is loaded with a code for turning off all the header control valves off. The code is sent to ORB at step 1062 to turn all valves off and the program proceeds as previously described.

If the test at step 1058 proves false then the left end of the header must be raised. The gain factored error for channel 1 is retrieved from location MA5A at step 1082 and at step 1084 the A register is loaded with a code which will be used to enable the valve to raise the left side of the header. The on-time is saved at step 1086 and the valve is turned on at step 1062 as previously explained.

If the test at step 1054 proves false then the right or channel 2 side of the header may require adjustment. At step 1072 the channel 2 control flag in MA14A is tested for the value 80(H). If the test proves true then the right side of the header must be lowered. The channel 1 control flag is tested at step 1090 to see if the left side also requires some control. Assuming it does not then a right tilt is required. The tilt limit Flag 5 is checked at step 1092 and if it is zero then the header is right tilted to its limit. No control is permitted and the program branches to step 1060 to load the A register with the value for turning all valves off. Steps 1062 and 1064 are then executed as previously described.

If the header is not right tilted to its limit, the test at step 1092 proves false. Step 1093 decrements the tilt position value at Flag 5 and loads the A register with a code for controlling right tilting of the header. The gain factored error is entered in Flag 2 at step 1086 and the code for energizing the right-tilt valve is sent to ORB at step 1062.

If the test at step 1090 proves false, then both the left and right sides of the header require control. Step 1091 tests the channel 1 control flag for the value 80. If it is not 80 then the control flag is calling for raising the left side. Since channel 2 calls for lowering the header and channel 1 calls for raising the header, the program moves to step 1092 and proceeds with a right tilt operation as previously described.

If the test at step 1091 proves true, then both channel control flags are calling for a lowering operation. In this case the gain factored errors for the two channels are compared at step 1094 and the smallest error is used to control downward movement of the header. If channel 2 has the smaller gain factored error the test at step 1094 proves true and the program branches to step 1098 to place in the A register a code for turning on the down valve. The channel 2 gain factored error is entered in Flag 2 at step 1086 to control the on time. On the other hand, if channel 1 has the smaller gain factored error the test at step 1094 proves false and the channel 1 error is placed in the B register at step 1096 so that it is loaded into Flag 2 at step 1086 to control the on time of the down valve.

If the test at step 1072 proves false, then the right side of the header requires raising. The channel 2 gain factored error is entered in the B register at step 1074 and the channel 1 control flag is tested at step 1076. If the channel 1 control flag is zero then the left side of the header requires no adjustment. The program branches to step 1084 where the A register is loaded with the code for energizing the value to raise the header. The gain factored error for channel 2 is entered in Flag 2 at step 1086 to control the valve on time and the valve is turned on at step 1062.

If the test at step 1076 proves false, the channel 1 direction control flag is tested for a value of 80(H) at step 1078. If the test proves true then the left side of the header requires lowering. This, combined with the requirement to raise the right side, is equivalent to a left tilt. The program branches from step 1078 to step 1066 and carries out a left tilt control as previously described.

If the test at step 1078 proves false, then the channel 1 direction control flag is also calling for a raise operation. Step 1080 compares the gain factored errors for the two channels. The larger of the two values is used. Thus, if the test at step 1080 proves true the program branches to step 1084 to load the code in the A register for turning on the raise valve. The channel 2 gain factored error in register B is entered into Flag 2 at step 1086 to control the on time and at step 1062 the raise valve is turned on.

If the test at step 1080 proves false, the gain factored error for channel 1 is entered into the B register and after the code for turning on the raise valve is entered in register A the error is entered in Flag 2 to control the on time. The raise valve is then turned on at step 1062.

In FIG. 10A, if the operator indicated a desire to change the mid-point or reference value, the test at step 1020 will prove false. Flag 1 or Flag 3 (in location X+13) is tested at step 1022 for the value 80(H) and if the test proves false the flag is decremented at step 1024 and again tested for a zero value at step 1026. If this test proves true, the system has completed its response to actuation of the set switch and the program branches to step 1030 where it proceeds with header height adjustment as described above.

If the test at step 1022 proves true it means that the system has not yet responded to actuation of the set switch. The program branches to step 1028 where the average count developed at step 1018 is stored at X+9 and X+10 (MA3A/B or MA13A/B) as the new mid-point value. Flag 1 or Flag 3 at location (X+13) is cleared. From step 1028 the MAIN routine proceeds as previously described using the new mid-point value for determining the header positioning error.

While specific preferred embodiments of the invention have been described in detail, it will be understood that various modifications and substitutions may be made in the described embodiment without departing from the spirit and scope of the invention. For example, two microprocessors may be provided, one for supervising each channel. The horns 114 need not be transmit/receive transducers but may comprise a microphone and separate speaker. The number of pulses in a burst may vary. The frequency of the pulses may also vary. Frequencies between about 4.95 and 6.3 KHz have been tried with the lower frequencies providing the more reliable results. Even lower frequencies might provide even better reliability. However, as the pulse frequency is lowered the longer wavelengths result in more imprecise detection.

We claim:

1. A method of controlling the position of an implement carried by an apparatus moving over ground having foliage thereon, said method comprising the steps of:
   generating and transmitting toward the ground first and second sonic bursts each of a fixed time duration, said first and second sonic bursts being separated by a fixed interval of time, each of said sonic bursts comprising a plurality of cycles of sound waves in the audio frequency range;
   sensing for echoes of said first and second sonic bursts reflected from the ground;
   generating a position signal whose magnitude represents the interval of time elapsing between the time one of said sonic bursts is sensed and the time the echo of said one sonic burst is sensed;
   determining the interval of time elapsing between the sensing of the echo of said first sonic burst and the sensing of the echo of the second sonic burst; and,
   using the generated position signal to control the position of the implement only if each sensed echo is of a given time duration and the interval of time elapsing between the sensing of the echoes of the first and second sonic bursts is substantially equal to the fixed interval of time between said first and second sonic bursts.

2. A method as claimed in claim 1 wherein said bursts comprise a plurality of cycles of sound waves in the range of frequencies between 4.9 andf 6.3 KHz.

3. A method as claimed in claim 1 wherein said bursts comprise a plurality of cycles of sound waves having a frequency of about 5 KHz.

4. A system for controlling the position of an implement carried by an apparatus moving over ground having foliage thereon, said system comprising:
   means for generating and transmitting toward the ground first and second sonic bursts separated by a fixed interval of time, each of said bursts comprising a plurality of cycles of sound waves in the audio frequency range;
   means for sensing echoes of said sonic bursts reflected from the ground;
   means for generating a position signal whose magnitude represents the interval of time elapsing between the time one of said bursts is generated and the time the echo of said one burst is sensed;
   means responsive to said sensing means for determining the interval of time between the sensing of the echoes of said first and second burst; and,
   means responsive to said position signal and to said means for determining the interval of time between the sensing of the echoes for controlling the position of the implement in accordance with said position signal only if the interval of time between the sensing of the echoes is substantially equal to the fixed interval of time between the first and second bursts.

5. A system as claimed in claim 4 wherein the means for generating and transmitting the first and second sonic bursts comprises a speaker for converting electrical pulses to sound waves, an oscillator for producing electrical pulses, and a logic circuit responsive to said oscillator pulses for applying selected ones of said oscillator pulses to said speaker.

6. A system as claimed in claim 4 wherein the means for generating and transmitting the first and second sonic bursts and the means for sensing echoes of said sonic bursts includes a single electromechanical transducer for converting electrical pulses to sound waves or converting sound waves to electrical signals.

7. A system as claimed in claim 6 wherein the means for generating and transmitting the first and second sonic bursts includes an oscillator for producing electrical pulses and logic circuit means for applying selected ones of the electrical pulses to said transducer.

8. A system as claimed in claim 7 and further comprising gating means connected between said transducer and the means for determining the interval of time between the sensing of the echoes, said gating means being responsive to said logic circuit means for passing electrical signals from said transducer to the means for determining the interval of time between the sensing of the echoes only for a fixed interval of time occurring after a last oscillator pulse is applied to said transducer.

9. A system as claimed in claim 4 and further comprising envelope detector means responsive to said sensing means and pulse width detector means responsive to said envelope detector means for producing a pulse only when said sensing means senses an echo burst having a given duration, said means for determining the interval of time between the sensing of the echoes comprising pulse spacing detector means for passing a pulse only if the interval of time between two pulses produced by said pulse width detector means is substantially equal to the fixed interval of time between the first and second sonic bursts.

10. A system as claimed in claim 4 wherein the means for generating a position signal comprises a ramp signal generator for producing a ramp signal and a sample and hold circuit responsive to said means for determining the interval of time between the sensing of echoes for sampling and holding said ramp signal.

11. A system as claimed in claim 4 wherein the means for generating a position signal and the means for determining the interval of time between the sensing of the echoes comprises a microprocessor.

12. A system as claimed in claim 11 wherein said means for generating and transmitting said first and second sonic bursts comprises a transducer for converting electrical pulses to sound waves, said microprocessor including means for applying electrical pulses to said transducer to generate said first and second sonic bursts.

13. A system for controlling the position of an implement carried by a machine moving over ground having foliage thereon, the implement being supported on a support movable relative to the machine, said system comprising:
first and second transmitters for directing sonic bursts of audio frequency sound waves toward the ground, said transmitters being mounted on said support so as to move above said foliage;
means for energizing each of said transmitters to transmit first and second sonic bursts separated by a fixed interval of time;
first and second sensor means associated with said first and second transmitters, respectively, each sensor means sensing echoes of the first and second sonic bursts transmitted by its respective transmitter and reflected by the ground;
means responsive to said sensor means for determining when the first and second echoes sensed by the sensing means are separated by an interval of time substantially equal to said fixed interval of time;
first means for generating a first positioning signal which increases linearly from the time the first transmitter transmits one of said first and second sonic bursts to the time the echo of the sonic burst is sensed by the first sensor means;
second means for generating a second positioning signal which increases linearly from the time the second transmitter transmits one of said first and second sonic bursts to the time the echo of the sonic burst is sensed by the second sensor means;
means for moving the support on which the implement is supported; and,
means responsive to said first and second positioning signals and the means for determining when a first and second echo are separated by an interval of time substantially equal to said fixed interval of time for energizing the means for moving the support on which the implement is mounted.

14. A system as claimed in claim 13 wherein said first transmitter and first sensor are mounted on the support at one side of the implement and the second transmitter and second sensor are mounted on the support at a second side of the implement.

15. A system as claimed in claim 13 wherein said first transmitter and first sensor comprise a single transducer for converting electrical signals to sound waves or converting sound waves to electrical signals.

16. A system as claimed in claim 13 and further comprising pulsing means operating in a plurality of sequential cycles, said pulsing means, during each cycle, applying a pair of bursts of electrical signals to said first transmitter and subsequently applying a pair of bursts to said second transmitter, each of said bursts comprising a plurality of pulses occurring at an audio frequency rate and the bursts of a pair of bursts of electrical signals being separated by said fixed interval of time.

17. A system as claimed in claim 16 wherein said pulsing means comprises a single microprocessor.

18. A system as claimed in claim 16 wherein each of said bursts of electrical pulses comprises a plurality of pulses occurring at a rate of about 5 kc/sec.

19. A system for controlling the position of a cutting implement carried by an agricultural harvesting machine moving over ground having foliage thereon, the cutting implement being mounted on a support which is movable relative to the machine, said system comprising:
first and second transmitters mounted on said support for directing sound bursts toward the ground;
first and second sensor means mounted on said support for sensing echoes of sound bursts reflected from the ground, said sensors also sensing other sound signals occurring in their vicinity; and,
microprocessor means including,
means for applying a first pair of bursts of electrical signals to said first transmitter and a second pair of bursts of electrical signals to said second transmitter, said bursts of electrical signals in a pair being separated by a fixed interval of time and each burst comprising a plurality of electrical signals occurring at an audio frequency rate whereby said transmitters direct pairs of audible sound bursts toward the ground;
analyzer means responsive to said first and second sensor means for analyzing signals produced thereby and producing a control signal when two signals produced by one of said sensor means are separated by an interval substantially equal to said fixed interval of time;

generator means for generating a position signal which linearly increases from the time a sound burst is transmitted until the time it is sensed;

sample means responsive to said generating means and said control signal for sampling said position signal; and, means responsive to said sample means for positioning said support.

20. A system as claimed in claim 19 wherein said microprocessor includes means for disabling said first and second sensors while said pairs of burst of electrical signals are being applied to said first and second transmitters, respectively.

21. A system as claimed in claim 20 wherein said microprocessor includes means for enabling said transmitters and said sensor means in a sequence wherein the first transmitter, the first sensor means, the second transmitter and the second sensor are energized sequentially.

* * * * *